US010250502B2

(12) United States Patent
Jiang et al.

(10) Patent No.: US 10,250,502 B2
(45) Date of Patent: *Apr. 2, 2019

(54) SOFTWARE DEFINED NETWORK-BASED DATA PROCESSING METHOD, NODE, AND SYSTEM

(71) Applicant: HUAWEI TECHNOLOGIES CO.,LTD., Shenzhen, Guangdong (CN)

(72) Inventors: Song Jiang, Hangzhou (CN); Mingzhen Xia, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

This patent is subject to a terminal disclaimer.

(21) Appl. No.: 15/720,171

(22) Filed: Sep. 29, 2017

(65) Prior Publication Data

US 2018/0131608 A1 May 10, 2018

Related U.S. Application Data

(63) Continuation of application No. 14/919,211, filed on Oct. 21, 2015, now Pat. No. 9,787,588, which is a (Continued)

(30) Foreign Application Priority Data

Dec. 24, 2012 (CN) .......................... 2012 1 0564522

(51) Int. Cl.
*H04L 12/741* (2013.01)
*H04L 12/715* (2013.01)
(Continued)

(52) U.S. Cl.
CPC .............. *H04L 45/74* (2013.01); *H04L 45/42* (2013.01); *H04L 45/64* (2013.01); *H04L 47/18* (2013.01)

(58) Field of Classification Search
None
See application file for complete search history.

(56) References Cited

U.S. PATENT DOCUMENTS

| 2010/0014517 A1 | 1/2010 | Huang et al. |
| 2010/0165878 A1 | 7/2010 | Soni |

(Continued)

FOREIGN PATENT DOCUMENTS

| CN | 102308534 A | 1/2012 |
| CN | 102317876 A | 1/2012 |

(Continued)

OTHER PUBLICATIONS

XP55091501A. Rob Sherwood et al. FlowVisor: A Network Virtualization Layer.OPENFLOW-TR-2009-1.Oct. 14, 2009. Retrieved from the internet:http://OpenFlowSwitch.org/downloads/technicalreports/openflow-tr-2009-1-flowvisor.PDF Total 16 pages.

(Continued)

Primary Examiner — Peter Chen
(74) Attorney, Agent, or Firm — Daniel Burns

(57) ABSTRACT

The present disclosure discloses a software defined network SDN-based data processing system, and the system includes: a source data node, configured to receive a first data packet, and send to a corresponding source control node; the source control node, configured to receive the first data packet, where the first data packet carries a destination address of the first data packet; and determine a destination control node; and the destination control node, configured to receive the first data packet, and generate a second data packet and a matching policy rule. According to a software defined network-based data processing system in an embodiment of the present disclosure, the collaboration capability between nodes is improved so as to reduce the redundancy of multi-node processing in a network device, thereby improving the service processing efficiency of the network.

(Continued)

The present disclosure further discloses a software defined network-based data processing method and device.

34 Claims, 18 Drawing Sheets

Related U.S. Application Data continuation of application No. 14/096,586, filed on Dec. 4, 2013, now Pat. No. 9,203,748, which is a continuation of application No. PCT/CN2013/079908, filed on Jul. 23, 2013.

(51) Int. Cl.
    *H04L 12/717*    (2013.01)
    *H04L 12/801*    (2013.01)

(56) References Cited

U.S. PATENT DOCUMENTS

| | | |
|---|---|---|
| 2011/0289230 A1 | 11/2011 | Ueno |
| 2011/0317701 A1 | 12/2011 | Yamato et al. |
| 2013/0086236 A1 | 4/2013 | Baucke et al. |
| 2013/0148667 A1 | 6/2013 | Hama et al. |
| 2013/0250958 A1 | 9/2013 | Watanabe |
| 2013/0266017 A1 | 10/2013 | Akiyoshi |
| 2013/0329566 A1 | 12/2013 | Wong et al. |
| 2014/0341019 A1 | 11/2014 | Yamagata et al. |

FOREIGN PATENT DOCUMENTS

| | | |
|---|---|---|
| CN | 102714628 A | 10/2012 |
| CN | 103051629 A | 4/2013 |
| EP | 2506505 A1 | 10/2012 |
| EP | 2765751 A1 | 8/2014 |
| WO | 2011083780 A1 | 7/2011 |

OTHER PUBLICATIONS

XP032217657, Koerner et al., "Multiple Service Load-Balancing with OpenFlow," 2012 IEEE 13th International Conference on High Performance Switching and Routing, Jun. 2012. pp. 210-214.

XP015083916, Chen et al., "Software Defined Networks Use Case for Virtual Connection and Network on Demand," Network Working Group, Internet-Draft,draft-mm-sdn-vc-on-demand-use-case-00. Jul. 9, 2012. pp. 1-9.

OpenFlow Switch Specification, Version 1.3.1 (Wire Protocol 0x04). Open Networking Foundation. Sep. 6, 2012. total 128 pages.

SOFTWARE DEFINED NETWORK-BASED DATA PROCESSING METHOD, NODE, AND SYSTEM

CROSS-REFERENCE TO RELATED APPLICATIONS

This application is a continuation of U.S. patent application Ser. No. 14/919,211, filed on Oct. 21, 2015, which is a continuation of U.S. patent application Ser. No. 14/096,586 filed on Dec. 4, 2013, now U.S. Pat. No. 9,203,748. which is a continuation of International Patent Application No. PCT/CN2013/079908, filed on Jul. 23, 2013, The International Patent Application claims priority to Chinese Patent Application No. 201210564522.5, filed on Dec. 24, 2012. The afore-mentioned patent applications are hereby incorporated by reference in their entireties.

TECHNICAL FIELD

The present disclosure relates to the field of communications technologies, and in particular, to software defined network-based data processing methods, nodes, and systems.

BACKGROUND

Currently, a networking mode of device nodes in a common access network basically adopts a distributed autonomic network structure. In this network structure, each network node is configured separately and works independently. Therefore, asymmetric information between network nodes exists, which causes problems such as incapability of sharing service capabilities between different network nodes, lack of collaboration, and redundant and repeated execution of service functions, so that the processing performance of the whole network is poor. Several scenarios of unreasonable network node capability distribution that are very common in network application are described as follows:

1) As shown in FIG. 1, multiple client clusters and server clusters access a network through different network nodes, where a client cluster 1 accesses the network through a node A, and a server cluster 1 accesses the network through a node B. An HTTP (Hypertext Transport Protocol) protocol-based IPS (Intrusion Prevention System) service processing capability is allocated for the network node A; and a service processing capability of URL (Uniform Resource Locator) filtering is allocated for the node B. When a network service flow passes the node A and the node B sequentially, the node A and the node B perform DPI (Deep Packet Inspection) identification and parsing processing on the service flow at an application layer due to the need of service processing, thereby causing that different devices execute a part of functions repeatedly on the same service flow.

2) As shown in FIG. 2, multiple client clusters and server clusters access a network through different network nodes, where a client cluster 1 accesses the network through a node A, and a server cluster 1 accesses the network through a node B. A message content-based compression capability is allocated for the network node A, but the node B does not have the decompression capability. When transmission acceleration needs to be performed on a service flow at an application layer the message may undergo content compression when passing the source end node A, but cannot be decompressed when passing the destination node B, so that a network acceleration service cannot be implemented.

Due to the distributed structure of the existing network and the separate deployment manner of nodes, service capabilities of network nodes are private lack unified collaboration management, so that the whole network lacks collaboration for related service processing at the application layer, the processing is redundant, and the efficiency is reduced.

How to implement unified resource management on network nodes, reasonably distribute node capabilities and coordinate service scheduling, and implement multi-node capability sharing and cooperation so as to improve the processing efficiency of the whole network is a major problem being faced currently.

SUMMARY

Embodiments of the present disclosure provide a software defined network (Software Defined Network, SDN)-based data processing system, method, and device, which improves the collaboration capability between nodes, thereby improving the service processing efficiency of the network.

Embodiments in a first aspect of the present disclosure provide a software defined network-based data processing system, and the system includes: a source data node, configured to receive a first data packet, and send the first data packet to a corresponding source control node; a source control node, configured to receive the first data packet sent by the source data node, where the first data packet carries a destination address of the first data packet, and determine a destination control node according to the destination address of the first data packet; and the destination control node, configured to receive the first data packet, and generate a second data packet according to the first data packet and a matching policy rule.

In a possible implementation manner of the embodiments in the first aspect of the present disclosure, the source data node is specifically configured to receive the first data packet, where the first data packet carries a source IP address of the first data packet, determine, according to the source IP address of the first data packet or according to mapping between a data node and a control node, the source control node corresponding to the source data node, and send the first data packet to the corresponding source control node.

With reference to any of the foregoing embodiments, in a second possible implementation manner of the embodiments in the first aspect of the present disclosure, the source control node is specifically configured to receive the first data packet sent by the source data node, where the first data packet carries the destination address of the first data packet, and determine a destination data node according to the destination address of the first data packet; and if the source control node does not manage the destination data node, determine the first control node managing the source data node and the destination data node as the destination control node.

With reference to any of the foregoing embodiments, in a third possible implementation manner of the embodiments in the first aspect of the present disclosure, the source control node or the source data node is further configured to send the first data packet to the destination control node.

With reference to any of the foregoing embodiments, in a fourth possible implementation manner of the embodiments in the first aspect of the present disclosure, the matching policy rule includes: mapping/correspondence between sub-tuple information and an action parameter or a policy parameter, or mapping between application layer information and an action parameter or a policy parameter; the destination control node is specifically configured to: receive the first data packet, search the matching policy rule, according to sub-tuple information of the first data packet or application layer information of the first data packet, for an action parameter or a policy parameter corresponding to the sub-tuple information of the first data packet or the application layer information of the first data packet; and generate the second data packet according to the found action parameter or policy parameter.

With reference to any of the foregoing embodiments, in a fifth possible implementation manner of the embodiments in the first aspect of the present disclosure, the data processing system further includes one or more serving nodes; the matching policy rule includes: mapping/correspondence between sub-tuple information and an action parameter or a policy parameter, or mapping between application layer information and an action parameter or a policy parameter; the destination control node is specifically configured to: receive the first data packet, search the matching policy rule, according to sub-tuple information of the first data packet or application layer information of the first data packet, for an action parameter or a policy parameter corresponding to the sub-tuple information of the first data packet or the application layer information of the first data packet; and send, according to the found action parameter or policy parameter, capability request information to a first serving node having the capability of executing the action parameter or policy parameter in the one or more serving nodes; the first serving node is configured to send corresponding capability response information to the destination control node in response to the capability request information; and the destination control node generates the second data packet according to the capability response information.

With reference to any of the foregoing embodiments, in a sixth possible implementation manner of the embodiments in the first aspect of the present disclosure, the destination control node is further configured to send a second data packet to the source data node, where the second data packet carries a destination address of the second data packet; and the source data node is further configured to send, under management of the destination control node, the second data packet to a data node corresponding to the destination address of the second data packet.

With reference to any of the foregoing embodiments, in a seventh possible implementation manner of the embodiments in the first aspect of the present disclosure, the data processing system further includes: at least one relay data node, where the destination control node is configured to manage each relay data node; the relay data node stores a flow table corresponding to the relay data node, where the flow table is used to store a processing rule of a data packet; the source data node stores a flow table corresponding to the source data node, where the flow table is used to store a processing rule of a data packet: the destination control node is further configured to generate a routing distribution rule and deliver the routing distribution rule to the relay data node and the source data node, where the routing distribution rule is used to allocate a route for the second data packet; the relay data node is further configured to receive the routing distribution rule sent by the destination control node, and update the flow table of the relay data node according to the routing distribution rule; the source data node is further configured to send the second data packet to a relay data node corresponding to the destination address of the second data packet according to the updated flow table; and the relay data node is configured to send, according to the updated flow table, the second data packet to a destination data node corresponding to the destination address of the second data packet.

With reference to any of the foregoing embodiments, in an eighth possible implementation manner of the embodiments in the first aspect of the present disclosure, the source data node further stores a flow table, where the flow table is used to store sub-tuple information of a service flow data packet and a processing rule corresponding to the sub-tuple information; the destination control node is further configured to add a control node number field and a service parameter field in the flow table of the source data node, where, the control node number field is used to represent an index of a destination control node corresponding to the source data node, and the service parameter field is used to represent an index corresponding to a processing result of the sub-tuple information of the service flow data packet.

With reference to the foregoing embodiments, in a ninth possible implementation manner of the embodiments in the first aspect of the present disclosure, the source data node is further configured to receive a third data packet, where both the third data packet and the first data packet belong to the service flow data packet, and a processing rule corresponding to sub-tuple information of the third data packet is the same as the processing rule corresponding to the sub-tuple information of the first data packet.

With reference to the foregoing embodiments, in a tenth possible implementation manner of the embodiments in the first aspect of the present disclosure, the source data node is further configured to determine, according to the flow table, a service parameter corresponding to the sub-tuple information from a processing rule record matching the sub-tuple information of the third data packet, where the service parameter is used to represent an index of an action parameter or a policy parameter to be executed for the third data packet; the source data node carries the service parameter in the third data packet and sends the third data packet to the destination control node; and the destination control node is further configured to determine, according to the service parameter and application layer information of the third data packet, the action parameter or policy parameter to be executed for the third data packet, so as to generate a fourth data packet.

With reference to any of the foregoing embodiments, in an eleventh possible implementation manner of the embodiments in the first aspect of the present disclosure, the destination control node is further specifically configured to add, in the flow table of the source data node, a control node number field and a service parameter field corresponding to the first data packet, where the control node number field is used to represent an index of a destination control node corresponding to the source data node, and the service parameter field corresponding to the first data packet is used to represent an index of a matching policy rule corresponding to sub-tuple information of the first data packet, where a service parameter corresponding to the third data packet is the index of a matching policy rule of the sub-tuple information of the first data packet; the source data node is further configured to carry the index of the matching policy rule of the sub-tuple information of the first data packet in the third data packet and send the third data packet to the destination control node; and the destination control node is further configured to determine, according to a matching policy rule corresponding to the index of the matching policy rule of the sub-tuple information of the first data packet and application layer information of the third data packet, the action parameter or policy parameter to be executed for the third data packet, so as to generate a fourth data packet.

In the SDN network system according to the embodiment of the present disclosure, in a hierarchical deployment manner of control nodes, an extended data node flow table structure, and a capability distribution method according to a policy rule, application layer service processing and capability sharing distribution in an SDN network are implemented, so that collaboration between nodes is improved to reduce the redundancy of multi-node processing in a network device, and the problems of unreasonable node capability distribution, capability dissymmetry, and capability non-aggregation are solved, thereby improving the service processing efficiency of the network; at the same time, the hierarchical deployment manner of control nodes solves the bottleneck of processing performance of the control nodes, and maintains the stability, reliability, and scalability of the network.

Embodiments in a second aspect of the present disclosure discloses a software defined network-based data processing method, and the method includes: receiving, by a source data node, a first data packet; sending, by the source data node, the first data packet to a corresponding source control node, where the first data packet carries a destination address of the first data packet, so that the source control node determines a destination control node according to the destination address of the first data packet, and the destination control node generates a second data packet according to the first data packet.

In a first possible implementation manner of the embodiments in the second aspect of the present disclosure, the second data packet carries a destination address of the second data packet, and the method further includes: receiving, by the source data node, the second data packet sent by the destination control node; and sending, by the source control node, the second data packet to a data node corresponding to the destination address of the second data packet.

With reference to any of the foregoing embodiments, in a second possible implementation manner of the embodiments in the second aspect of the present disclosure, the first data packet carries a source IP address of the first data packet, and before the sending, by the source data node, the first data packet to a corresponding source control node, the method further includes: determining the corresponding source control node according to the source IP address of the first data packet or according to mapping between the source data node and a control node.

With reference to any of the foregoing embodiments, in a third possible implementation manner of the embodiments in the second aspect of the present disclosure, the source data node further stores a flow table, where the flow table is used to store sub-tuple information of a service flow data packet and a processing rule corresponding to the sub-tuple information; after the source data node sends the first data packet to the corresponding source control node, the method further includes: receiving, by the source data node, first control information sent by the destination control node; adding, by the source data node, a control node number field and a service parameter field in the flow table of the source data node according to the first control information, where the control node number field is used to represent an index of a destination control node corresponding to the source data node, and the service parameter field is used to represent an index corresponding to a processing result of the sub-tuple information of the service flow data packet.

With reference to any of the foregoing embodiments, in a fourth possible implementation manner of the embodiments in the second aspect of the present disclosure, after adding the control node number field and the service parameter field in the flow table of the source data node, the method further includes: receiving, by the source data node, a third data packet, where both the third data packet and the first data packet belong to the service flow data packet, and a processing rule corresponding to sub-tuple information of the third data packet is the same as the processing rule corresponding to the sub-tuple information of the first data packet; determining, by the source data node according to the flow table, a service parameter corresponding to the sub-tuple information from a processing rule record matching the sub-tuple information of the third data packet, where the service parameter is used to represent an index of an action parameter or a policy parameter to be executed for the third data packet; carrying, by the source data node, the service parameter in the third data packet and sending the third data packet to the destination control node, so that the destination control node determines, according to the service parameter and application layer information of the third data packet, the action parameter or policy parameter to be executed for the third data packet, so as to generate a fourth data packet.

According to a software defined network-based data processing method provided in the embodiment of the present disclosure, by performing, on a control node, various processing on a data packet received by a data node, the collaboration capability between nodes is improved and the redundancy of multi-node processing in a network device is reduced as well; moreover, the capability of the network device to process a service flow data packet is improved, thereby improving the service processing efficiency of the network.

Embodiments in a third aspect of the present disclosure discloses a software defined network-based data processing method, and the method includes: receiving, by a destination control node, a first data packet, where the first data packet carries a destination address of the first data packet, the destination control node is determined by a source control node according to the destination address of the first data packet, and the source control node corresponds to a source data node receiving the first data packet; generating, by the destination control node, a second data packet according to the first data packet and a matching policy rule; and sending the second data packet to the source data node, where the source data node receives the first data packet and corresponds to the source control node.

In a first possible implementation manner of the embodiments in the third aspect of the present disclosure, before the receiving, by a destination control node, a first data packet, the method further includes: receiving, by the destination control node, a fifth data packet sent by the source control node, where the fifth data packet carries a destination address of the fifth data packet; determining a destination data node according to the destination address of the fifth data packet; and if the destination control node does not manage the destination data node, determining a first control node managing the destination data node and the source data node as a second destination control node.

With reference to the foregoing embodiment, in a second possible implementation manner of the embodiments in the third aspect of the present disclosure, the receiving, by the destination control node, a first data packet specifically includes: receiving, by the destination control node, the first data packet sent by the source control node or the source data node.

With reference to any of the foregoing embodiments, in a third possible implementation manner of the embodiments in the third aspect of the present disclosure, the matching policy rule includes: mapping/correspondence between sub-tuple information and an action parameter or a policy parameter, or mapping between application layer information and an action parameter or a policy parameter; the generating, by the destination control node, a second data packet according to the first data packet and a matching policy rule includes: searching the matching policy rule, according to sub-tuple information of the first data packet or application layer information of the first data packet, for an action parameter or a policy parameter corresponding to the sub-tuple information of the first data packet or the application layer information of the first data packet; and generating the second data packet according to the found action parameter or policy parameter.

With reference to any of the foregoing embodiments, in a fourth possible implementation manner of the embodiments in the third aspect of the present disclosure, the matching policy rule includes: mapping/correspondence between sub-tuple information and an action parameter or a policy parameter, or mapping between application layer information and an action parameter or a policy parameter; the generating, by the destination control node, a second data packet according to the first data packet and a matching policy rule includes: searching the matching policy rule, according to sub-tuple information of the first data packet or application layer information of the first data packet, for an action parameter or a policy parameter corresponding to the sub-tuple information of the first data packet or the application layer information of the first data packet; sending, according to the found action parameter or policy parameter, capability request information to a first serving node having the capability of executing the action parameter or policy parameter in one or more serving nodes; receiving, by the destination control node, corresponding capability response information sent by the first serving node in response to the capability request information; and generating, by the destination control node, the second data packet according to the capability response information.

With reference to any of the foregoing embodiments, in a fifth possible implementation manner of the embodiments in the third aspect of the present disclosure, after the determining, by the source control node, a destination control node according to the destination address of the first data packet, the method further includes: sending, by the destination control node, first control information to the source data node, where the first control information is used to add a control node number field and a service parameter field in a flow table of the source data node, the control node number field is used to represent an index of a destination control node corresponding to the source data node, and the service parameter field is used to represent an index corresponding to a processing result of sub-tuple information of the service flow data packet.

With reference to any of the foregoing embodiments, in a sixth possible implementation manner of the embodiments in the third aspect of the present disclosure, after adding a control node number field and a service parameter field in a flow table of the source data node, the method further includes: receiving, by the destination control node, a third data packet carrying a service parameter, where both the third data packet and the first data packet belong to the service flow data packet, a processing rule corresponding to sub-tuple information of the third data packet is the same as the processing rule corresponding to the sub-tuple information of the first data packet, the service parameter is a service parameter corresponding to the sub-tuple information, which is determined from a processing rule record matching the sub-tuple information of the third data packet, and the service parameter is used to represent an index of an action parameter or a policy parameter to be executed for the third data packet; determining, by the destination control node according to the service parameter and application layer information of the third data packet, the action parameter or policy parameter to be executed for the third data packet, so as to generate a fourth data packet; and sending, by the destination control node, the fourth data packet to the source data node.

According to a software defined network-based data processing method provided in the embodiment of the present disclosure, by performing, on a control node, various processing on a data packet received by a data node, the collaboration capability between nodes is improved and the redundancy of multi-node processing in a network device is reduced as well; moreover, the capability of the network device to process a service flow data packet is improved, thereby improving the service processing efficiency of the network.

Embodiments in a fourth aspect of the present disclosure discloses a data node for software defined network-based data processing, and the data node includes: a first receiving module and a first sending module, where the first receiving module is connected to the first sending module; the first receiving module is configured to receive a first data packet, the first sending module is configured to send the first data packet received by the first receiving module to a corresponding source control node, so that the source control node determines a destination control node according to a destination address of the first data packet, and the destination control node generates a second data packet according to the first data packet.

In a possible implementation manner of the embodiments in the fourth aspect of the present disclosure, the first receiving module is further configured to receive the second data packet sent by the destination control node; the first sending module is further configured to send, according to a destination address of the second data packet carried in the second data packet, the second data packet received by the receiving module to a data node corresponding to the destination address.

With reference to any of the foregoing embodiments, in a second possible implementation manner of the embodiments in the fourth aspect of the present disclosure, the data node further includes: a storage module, where the storage module is configured to store a flow table, the flow table is used to store sub-tuple information of a service flow data packet and a processing rule corresponding to the sub-tuple information; and the first data packet belongs to the service flow data packet.

With reference to any of the foregoing embodiments, in a third possible implementation manner of the embodiments in the fourth aspect of the present disclosure, the data node further includes: a first processing module, where the first processing module is connected to the first receiving module; the first receiving module is further r configured to receive first control information sent by the destination control node; the first processing module is configured to add, according to the first control information, a control node number field and a service parameter field in the flow table of the storage module, where the control node number field is used to represent an index of a destination control node corresponding to the source data node, and the service parameter field is used to represent an index corresponding to a processing result of sub-tuple information of the service flow data packet.

With reference to any of the foregoing embodiments, in a fourth possible implementation manner of the embodiments in the fourth aspect of the present disclosure, the first processing module is connected to the first sending module, the first receiving module is further configured to receive a third data packet, where both the third data packet and the first data packet belong to the service flow data packet, and a processing rule corresponding to sub-tuple information of the third data packet is the same as the processing rule corresponding to the sub-tuple information of the first data packet; the first processing module determines, according to the flow table, a service parameter corresponding to the sub-tuple information from a processing rule record matching the sub-tuple information of the third data packet, where the service parameter is used to represent an index of an action parameter or a policy parameter to be executed for the third data packet; and the first sending module carries the service parameter in the third data packet and sends the third data packet to the destination control node, so that the destination control node determines, according to the service parameter and application layer information of the third data packet, the action parameter or policy parameter to be executed for the third data packet, so as to generate a fourth data packet.

According to a data node for software defined network-based data processing, by performing various processing on a data packet received by the data node, the collaboration capability between nodes is improved and the redundancy of multi-node processing in a network device is reduced as well; moreover, the capability of the network device to process a service flow data packet is improved, thereby improving the service processing efficiency of the network.

Embodiments in a fifth aspect of the present disclosure discloses a destination control node for software defined network-based data processing, and the destination control node includes: a second receiving module, configured to receive a first data packet, where the first data packet carries a destination address of the first data packet, the destination control node is determined by a source control node according to the destination address of the first data packet, and the source control node corresponds to a source data node receiving the first data packet; and a second processing module, configured to generate a second data packet according to the second data packet received by the second receiving module and a matching policy rule.

In a first possible implementation manner of the embodiments in the fifth aspect of the present disclosure, the second receiving module is further configured to receive a fifth data packet, where the fifth data packet carries a destination address of the fifth data packet; the second processing module is configured to determine a destination data node according to the destination address of the fifth data packet; and if the second processing module does not manage the destination data node, determine a first control node managing the destination data node and the source data node as a second destination control node.

With reference to any of the foregoing embodiments, in a second possible implementation manner of the embodiments in the fifth aspect of the present disclosure, the second receiving module is specifically configured to receive the first data packet sent by the source control node or the source data node.

With reference to any of the foregoing embodiments, in a third possible implementation manner of the embodiments in the fifth aspect of the present disclosure, the matching policy rule includes: mapping/correspondence between sub-tuple information and an action parameter or a policy parameter, or mapping between application layer information and an action parameter or a policy parameter; the second processing module includes: a policy matching unit, configured to search the matching policy rule, according to sub-tuple information of the first data packet or application layer information of the first data packet, for an action parameter or a policy parameter corresponding to the sub-tuple information of the first data packet or the application layer information of the first data packet; and a second data packet generating unit, configured to generate the second data packet according to the action parameter or policy parameter found by the policy matching unit.

With reference to any of the foregoing embodiments, in a fourth possible implementation manner of the embodiments in the fifth aspect of the present disclosure, the matching policy rule includes: mapping/correspondence between sub-tuple information and an action parameter or a policy parameter, or mapping between application layer information and an action parameter or a policy parameter; the second processing module includes: a policy matching unit and a second data packet generating unit, where the policy matching unit is configured to search the matching policy rule, according to sub-tuple information of the first data packet or application layer information of the first data packet, for an action parameter or a policy parameter corresponding to the sub-tuple information of the first data packet or the application layer information of the first data packet; the second sending module is further configured to send, according to the action parameter or policy parameter found by the policy matching unit, capability request information to a first serving node having the capability of executing the action parameter or policy parameter in one or more serving nodes; the second receiving module is further configured to receive corresponding capability response information sent by the first serving node in response to the capability request information; and the second data packet generating unit is configured to generate the second data packet according to the capability response information received by the second receiving module.

With reference to any of the foregoing embodiments, in a fifth possible implementation manner of the embodiments in the fifth aspect of the present disclosure, the second sending module is further configured to send first control information to a source data node, where the first control information is used to add a control node number field and a service parameter field in a flow table of the source data node, the control node number field is used to represent an index of a destination control node corresponding to the source data node, and the service parameter field is used to represent an index corresponding to a processing result of sub-tuple information of the service flow data packet.

With reference to any of the foregoing embodiments, in a sixth possible implementation manner of the embodiments in the fifth aspect of the present disclosure, the second receiving module is further configured to receive a third data packet carrying a service parameter, where both the third data packet and the first data packet belong to the service flow data packet, a processing rule corresponding to sub-tuple information of the third data packet is the same as the processing rule corresponding to the sub-tuple information of the first data packet, the service parameter is a service parameter corresponding to the sub-tuple information, which is determined from a processing rule record matching the sub-tuple information of the third data packet, and the service parameter is used to represent an index of an action parameter or a policy parameter to be executed for the third data packet; the second processing module is further configured to determine, according to the service parameter and application layer information of the third data packet, the action parameter or policy parameter to be executed for the third data packet, and generate a fourth data packet; and the second sending module is further configured to send the fourth data packet to the source data node.

According to a control node for software defined network-based data processing provided in the embodiment of the present disclosure, by performing, on a control node, various processing on a data packet received by a data node, the collaboration capability between nodes is improved and the redundancy of multi-node processing in a network device is reduced as well; moreover, the capability of the network device to process a service flow data packet is improved, thereby improving the service processing efficiency of the network.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

In order to solve the collaboration problem between network devices, a concept of software defined network (Software Defined Network, SDN) is proposed. An SDN network includes a data transmission network formed by many data nodes such as switches and routers, and a control node for performing unified management and control on all the data nodes, where the control node communicates with the data nodes based on an openflow (OpenFlow) protocol.

Figure 1:
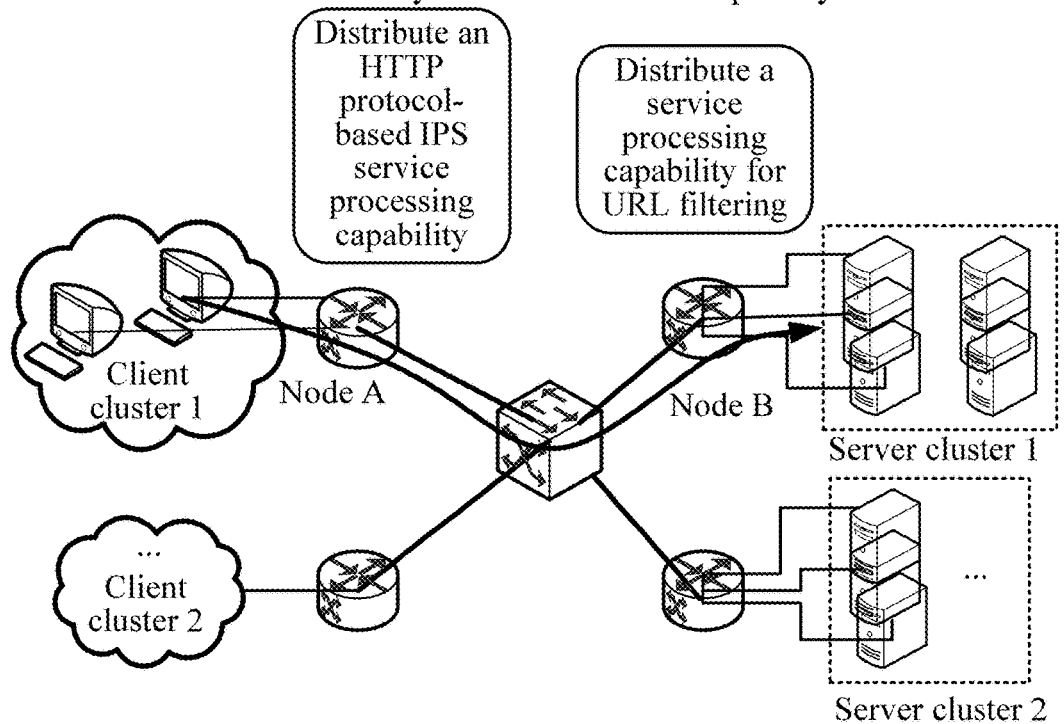
FIG. 1 is a schematic diagram of repeatedly executing identification and parsing functions caused by unreasonable node capability distribution in the prior art.
Figure 2:
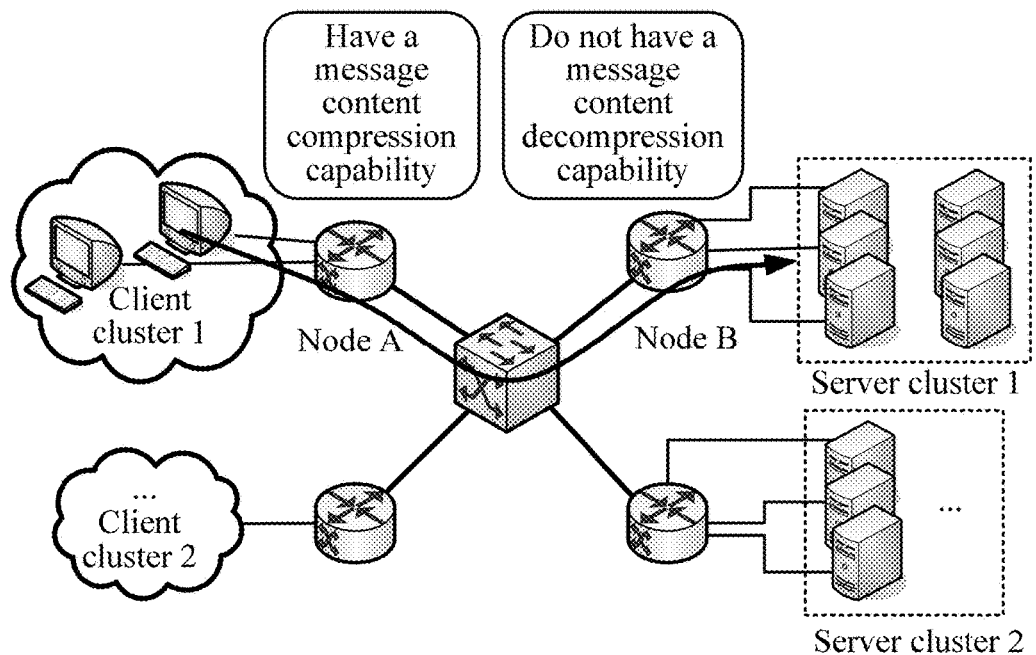
FIG. 2 is a schematic diagram of hard implementation of a part of services caused by node capability asymmetry in the prior art.
Figure 3:
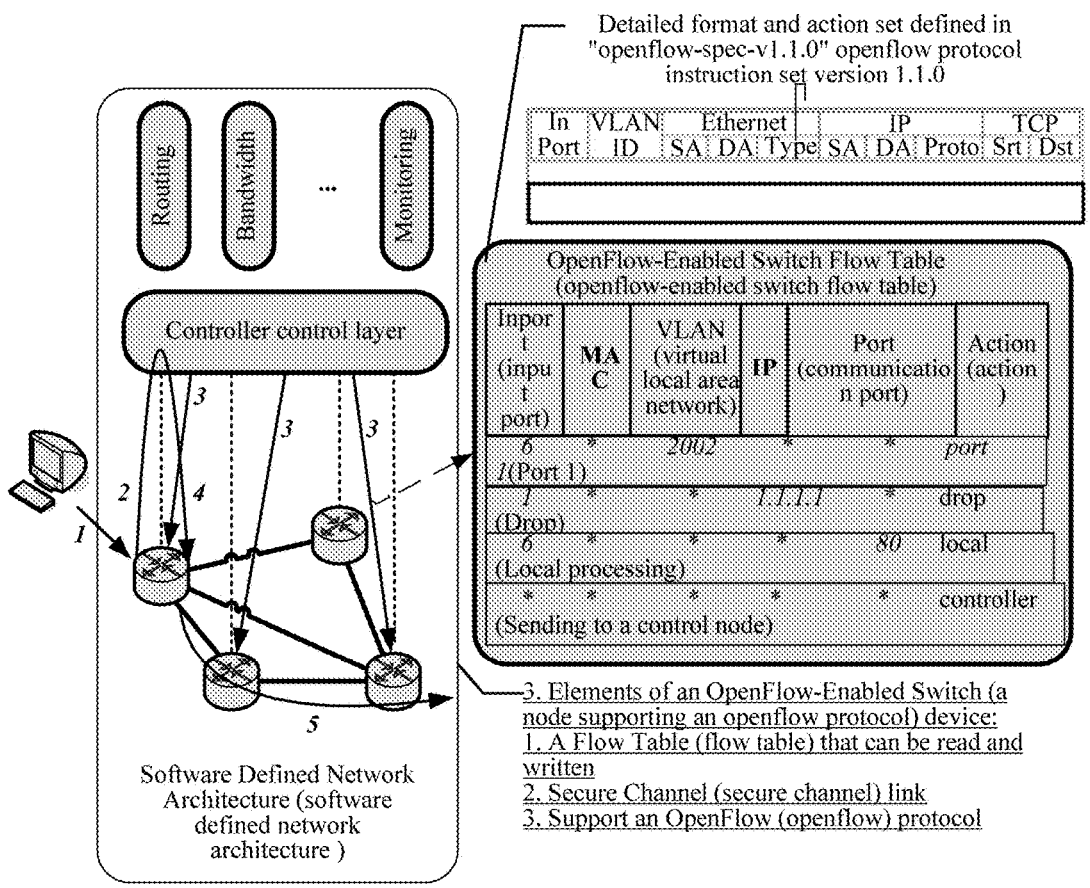
FIG. 3 is a schematic diagram of an SDN network structure and a flow table format of a data node supporting an openflow OpenFlow protocol.

The architecture of an SDN network in the industry is shown in FIG. 3, and the SDN network is mainly formed by three layers: a data plane, a control plane, and a service plane. The data plane is mainly formed by a switch or router device supporting the OpenFlow protocol, and on the basis of basic functions of supporting data exchange and distribution, this device requires possessing 3 elements required by the SDN network: (1) each data node device stores a flow table that can be read and written by a control node, where the flow table is formed by flow rules, each flow rule includes a transmission layer attribute of a flow and a corresponding action, and a current OpenFlow device of Type 0 supports four simple actions: forwarding, dropping, local processing, and sending to the control node; (2) the data node and the control node maintain a secure communication link; and (3) support an OpenFlow-based communication protocol interaction procedure. The control plane is formed by a single control node, the control node maintains an OpenFlow protocol-based communication link with each data node, and the control node can read and write a flow table of each data node through the OpenFlow protocol, so as to sense a state of each node, control a forwarding rule of each node, and adjust network routing, bandwidth resource distribution, and the like. In the current SDN network structure, the service plane is an abstract layer, and generally refers to a function that can be implemented by the control node, for example, the control node implements, by means of sensing states of the data nodes in the whole network, transmission layer service functions such as dynamic routing distribution, traffic load balancing, network status monitoring, and rapid fault location and analyzing.

The following describes a processing procedure of a message in an SDN network by taking a first data packet of a data message as an example, as shown in FIG. 3.

1. A first data packet of a request message of a client enters a data node A of an SDN network.

2. The node A performs flow table matching on the message to hit a default rule send to controller, and sends the message to a control node.

3. The control node allocates a route for a service flow according to a current network state in combination with a certain bandwidth and a routing distribution policy, delivers the rule to a corresponding data node through an OpenFlow protocol, and adds a rule corresponding to the flow into a flow table of the data node.

4. Then, the control node returns the message to the data node that sent the message.

5. Each data node forwards the message sequentially according to a flow table rule.

With reference to FIG. 3, the following describes a flow table format of the data node supporting the OpenFlow protocol.

In "openflow-spec-v1.1.0", as shown in the table at the upper right of FIG. 3, a defined format is as follows:

InPort: a port for a data packet to enter the data node, for example: a certain network port of a switch device;

VLANID: a label field between Layer 2 and Layer 3 in a TCP/IP protocol, where a source end may be labeled, and a destination end may be processed respectively according to different labels;

Ethernet SA: a source end physical address, and a source MAC (Medium Access Control, medium access control) address;

Ethernet DA: a destination end physical address, and a destination MAC address;

Ethernet Type: representing a Layer 2 message type of a bearer, for example, 0x8000 represents an IP message;

IP SA: an IP address of a source end;

IP DA: an IP address of a destination end;

IP Proto: a protocol type of an upper layer bearer of an IP layer, for example, 0x6 represents bearing a TCP protocol type message;

TCP Src: representing a TCP port of a source end; and

TCP Dst: representing a TCP port of a destination end.

As shown in FIG. 3, (1) for a service flow with a source being a port 6 and a VLAN (Virtual Local Area Network, virtual local area network) ID being 2002, a flow table matching rule is forwarding to a port 1; (2) for a service flow with a source being the port 1 and a destination address being 1.1.1.1, a flow table matching rule is drop (dropping); (3) for a service flow with a source being the port 6 and a communication port being 80, a flow table matching rule is local (local processing); and (4) for another service flow, a default flow table matching rule is controller, that is, uploading to a control node.

The concept and device of the SDN network are mainly applied in a small-scale network that is suitable for centralized management and control, such as a campus network or a lab, and the service plane is mainly aimed at a transmission layer service problem (such as routing control, network traffic balancing, network fault detection and rapid diagnosis, or dynamic link adjustment), without involving the solution of processing an application-layer-related service (such as URL filtering, network application acceleration, IPS defense, message protocol classification, or HTTP redirection service). The present disclosure is an improved extension method proposed for a limitation of the SDN network, and on the basis of the SDN network, the present disclosure proposes, in a manner of hierarchically deploying multiple nodes at a control layer, a method for implementing network-wide service capability sharing and application-layer-related service processing.

Figure 4:
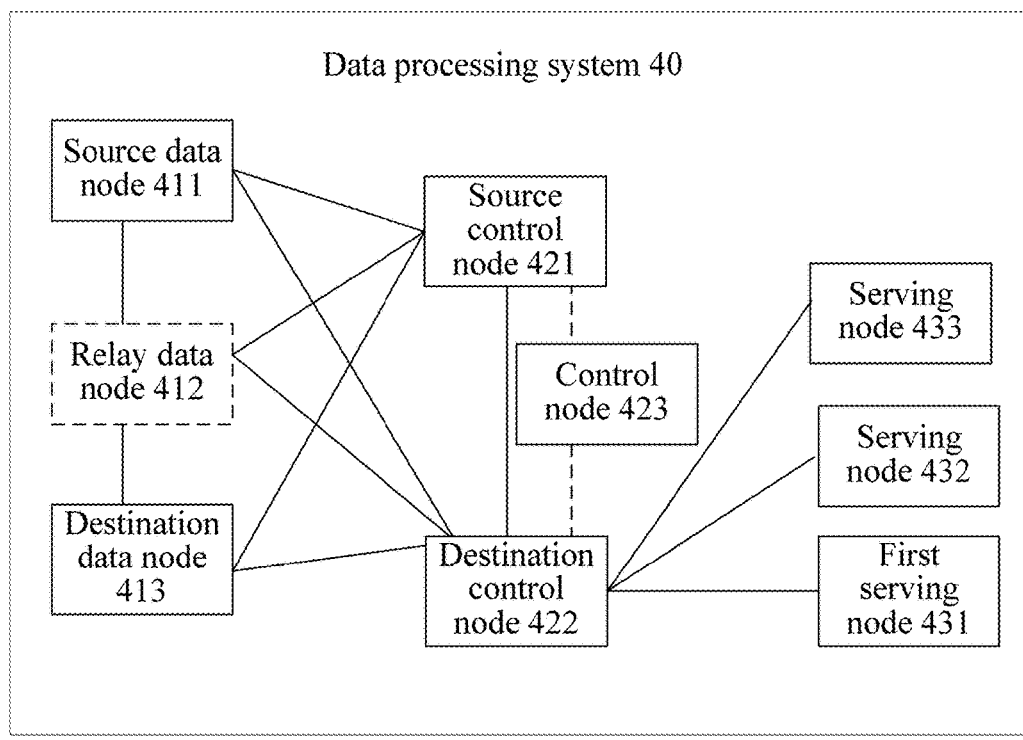
FIG. 4 is a schematic structural diagram of an SDN network system for data processing according to an embodiment in a first aspect of the present disclosure.

As shown in FIG. 4, a software defined network-based data processing system 40 according to an embodiment of the present disclosure is shown, and the system 40 includes: a source data node 411, configured to receive a first data packet, and send the first data packet to a corresponding source control node 421; the source control node 421, configured to receive the first data packet sent by the source data node 411, where the first data packet carries a destination address of the first data packet, and determine a destination control node 422 according to the destination address of the first data packet; and the destination control node 422, configured to receive the first data packet, and generate a second data packet according to the first data packet and a matching policy rule.

In an embodiment of the present disclosure, the corresponding source control node 421 is determined according to an IP address domain of the source data node 411 or according to mapping between the source data node 411 and a control node. A mapping table of a data node and a control node may be stored in the source data node 411, and the source control node 421 corresponding to the source data node 411 is determined by looking up the table, and the corresponding source control node 421 may also be determined through calculation according to the IP address domain of the source data node 411 or a physical topological structure. It can be understood that, the foregoing is only an example for helping understanding of the embodiment of the present disclosure, and cannot be considered as a limit to the embodiment of the present disclosure. The determining the source control node according to the source data node further includes another manner that can be implemented by a person of ordinary skill in the art without creative efforts.

In an embodiment of the present disclosure, the source control node 421 is specifically configured to receive the first data packet sent by the source data node 411, where the first data packet carries the destination address of the first data packet; determine a destination data node 413 according to the destination address of the first data packet; and if the source control node 421 does not manage the destination data node 413, determine a first control node managing the source data node 411 and the destination data node 413 as a destination control node 422.

As shown in FIG. 4, the source control node 421 may be directly connected to the destination control node 422, and may also be indirectly connected to the destination control node 422 through another control node 423 (only one is shown in the drawing, and multiple control nodes may exist in an actual situation). In another possible implementation manner, the source control node 421 also manages the destination data node 413, and at this time, the source control node 421 may be determined as the destination control node 422 (not shown in the drawing).

In an embodiment of the present disclosure, the source control node 421 or the source data node 411 is further configured to send the first data packet to the destination control node 422.

In an embodiment of the present disclosure, the matching policy rule includes: mapping/correspondence between sub-tuple information and an action parameter or a policy parameter, or mapping between application layer information and an action parameter or a policy parameter; the destination control node 422 is specifically configured to: receive the first data packet, and search the matching policy rule, according to sub-tuple information of the first data packet or application layer information of the first data packet, for an action parameter or a policy parameter corresponding to the sub-tuple information of the first data packet or the application layer information of the first data packet; and generate the second data packet according to the found action parameter or policy parameter.

The processing rule refers to a corresponding flow table entry and a processing action and a parameter designated in the flow table entry, which are obtained by the data node according to tuple information of the data packet and a flow table matching result. After the flow table matching, a flow table entry of the data node, which includes a processing action (send to controller, local, forward . . . ) and a parameter, is obtained.

In an embodiment of the present disclosure, the sub-tuple information includes: a source/destination MAC address of the data packet, a source/destination IP address, a source/destination TCP port, a network port as ingress/egress of the data node (switch), and a VLAN label of the data packet, where the information can be obtained from the data packet.

Figure 21:
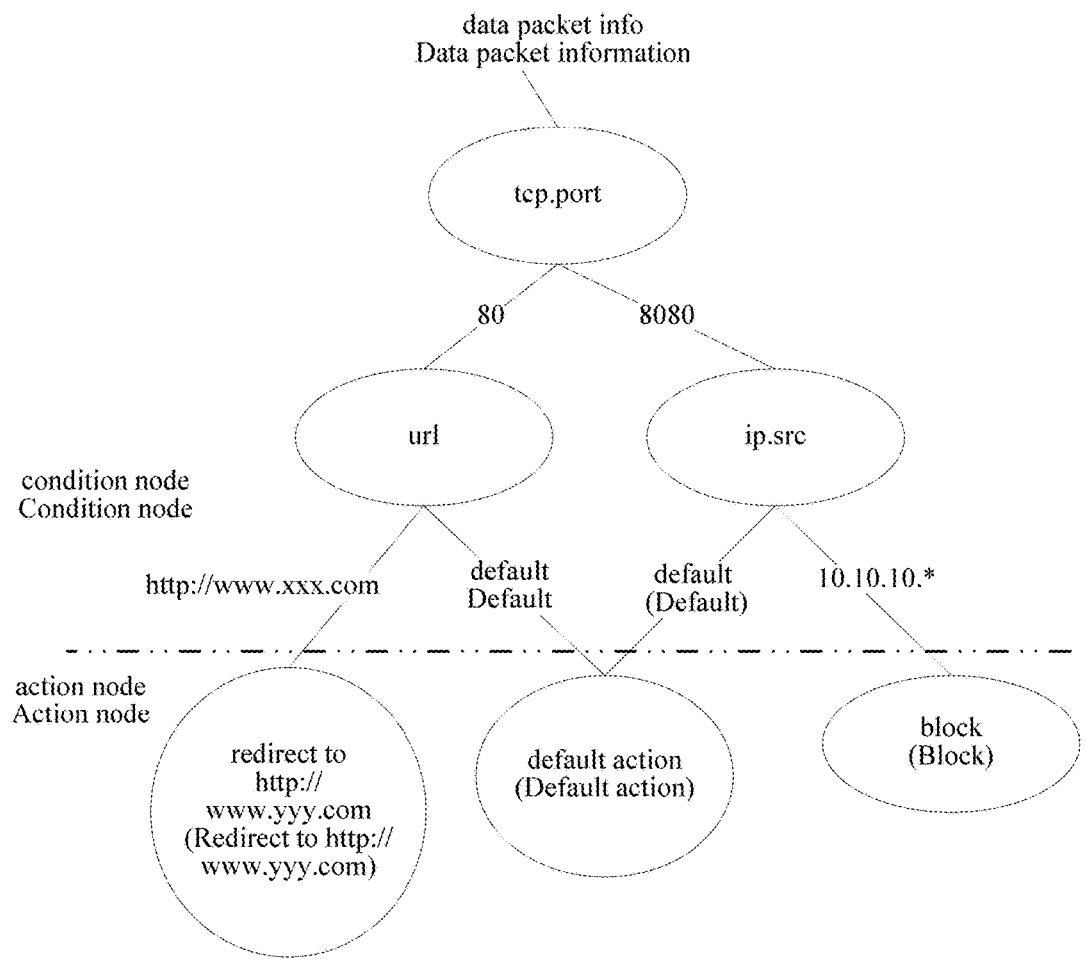
FIG. 21 is an exemplary diagram of specifically executing rule matching by a control node in an SDN data processing system according to an embodiment of the present disclosure.

In an embodiment of the present disclosure, as shown in FIG. 21, 1. a network administrator first configures a policy rule set through a management plane and delivers the policy rule set to a control node on a control plane; for example: the policy rule is, for example, a rule (1) IF tcp.port=80 && url=http://www.xxx.com THEN redirect to http://www.yyy-.com; and a rule (2) IF tcp.port=8080 && ip.src=10.10.10.* THEN block; and the policy rule set is a set formed by several policy rules; 2. the control node establishes a policy matching tree according to the policy rule, for example: a policy matching tree established according to the foregoing policy rule is shown in FIG. 21, where an inner node in the tree is a condition node, a leaf node is an action node, and each edge represents a matched condition; 3. The control node extracts tuple information such as tcp/ip/url from the received data packet, enters the matching tree to start rule matching with a node, and finally reaches a leaf node to hit a corresponding rule action.

The control node delivers a transmission layer condition (an L4 layer condition) to the data node, such as tcp.port=80 and ip.src=10.10.10.*, and marks for the delivered condition a number such as 0x0001 or 0x0002, that is, a service parameter field of the data node flow table. When the data node sends the data packet to the control node after performing flow table matching on the data packet to hit a flow table entry, the data node then adds the service parameter field value in the data packet to be carried to the control node, for example, a service parameter 0x0001 is carried to the control node, and then the control node corresponds to a hit condition tcp.port=80 according to the number 0x0001, so as to directly perform further rule matching from a url node of the matching tree, without the need of starting from a root node of the matching tree to match the transmission layer of the data packet (L4 layer condition) again. It can be understood that, the foregoing example is only an example for helping understanding of the embodiment of the present disclosure, instead of a limit to a specific solution of the embodiment of the present disclosure, a preset policy rule may be made in another manner, and the control node can also perform further rule matching according to other application layer information listed in the foregoing embodiment.

In the forgoing example, the application layer information may be URL information of the data packet, as shown in the following table, and the application layer information may be one piece of information shown in the following table:

| | |
|---|---|
| DestinationIPAddress | Destination IP address |
| InComingPort | Source port |
| DestinationPort | Destination port |
| InComingVirtualInterface | VLAN ID |
| Domain | Domain name |
| URL | URL information |
| ReqType | Request type |
| ContentType | Content type |
| ServiceType | Service type (defined through a string) |
| URLCategory | URL category |
| ReqSequence | Request sequence (request sequence in one PDP) |
| GroupReqSequence | URL group request sequence (request in one PDP) |
| Charset | Character set |
| Protocol | Protocol type |
| UserAgent | Terminal type |
| BrowserType | Browser type |
| UAProf | Terminal type capability |
| e_URL | Extended attribute URL |
| e_Charset | Extended attribute Character set |
| e_Accept | Extended attribute Accept |
| e_Accept-Charset | Extended attribute Accept-Charset |
| e_Accept-Language | Extended attribute Accept-Language |
| e_Accept-Encoding | Extended attribute Accept-Encoding |
| e_User-Agent | Extended attribute User-Agent |
| e_Profile(x-wap-profile) | Extended attribute Profile(x-wap-profile) |
| e_UA-* (UA-CPU/UA-color// UA-Pixels/etc) | Extended attribute UA-* |
| e_x-up-devcap-* (x-up-devcap-screenpixels/ x-up-devcap-iscolor/etc) | Extended attribute x-up-devcap-* |
| e_X-Nokia-*(X-Nokia- MusicShop-Version/X- Nokia-MusicShop- Bearer/etc) | Extended attribute X-Nokia-* |
| e_RedirectType | Extended attribute Redirection type |
| e_RedirectDesc | Extended attribute Redirection description |
| e_PermitHeader | Extended attribute Permit header definition |
| e_ReplaceHeader | Extended attribute Replace header definition |
| e_Toolbar | Extended attribute Toolbar solution |
| e_Protocol | Protocol ID |

In an embodiment of the present disclosure, the data processing system 40 further includes one or more serving nodes (see FIG. 431, FIG. 432, and FIG. 433); the matching policy rule includes: mapping/correspondence between sub-tuple information and an action parameter or a policy parameter, or mapping between application layer information and an action parameter or a policy parameter; the destination control node 422 is specifically configured to: receive the first data packet, search the matching policy rule, according to sub-tuple information of the first data packet or application layer information of the first data packet, for an action parameter or a policy parameter corresponding to the sub-tuple information of the first data packet or the application layer information of the first data packet; and send, according to the found action parameter or policy parameter, capability request information to a first serving node 431 having the capability of executing the action parameter or policy parameter in the one or more serving nodes; the first serving node 431 is configured to send corresponding capability response information to the destination control node 422 in response to the capability request information; and the destination control node 422 generates the second data packet according to the capability response information.

In an embodiment of the present disclosure, the destination control node 422 is further configured to send the second data packet to the source data node 411, where the second data packet carries a destination address of the second data packet; the source data node 411 is further configured to send, under management of the destination control node 422, the second data packet to a data node corresponding to the destination address of the second data packet.

In an embodiment of the present disclosure, the data processing system 40 further includes: at least one relay data node 412 (only one is shown in the drawing, and multiple relay data nodes may exist in an actual situation), where, the destination control node 422 is configured to manage each relay data node 412; the relay data node 412 stores a flow table corresponding to the relay data node 412, where the flow table is used to store a processing rule of a data packet; the source data node 411 stores a flow table corresponding to the source data node 411, where the flow table is used to store a processing rule of a data packet; the destination control node 422 is further configured to generate a routing distribution rule and deliver the routing distribution rule to the relay data node 412 and the source data node 411, where the routing distribution rule is used to allocate a route for the second data packet; the relay data node 412 is further configured to receive the routing distribution rule sent by the destination control node 422, and update the flow table of the relay data node 412 according to the routing distribution rule; the source data node 411 is further configured to send, according to the updated flow table, the second data packet to the relay data node 412 corresponding to the destination address of the second data packet; and the relay data node 412 is configured to send, according to the updated flow table, the second data packet to the destination data node 413 corresponding to the destination address of the second data packet.

In an embodiment of the present disclosure, the source data node 411 further stores a flow table, where the flow table is used to store sub-tuple information of a service flow data packet and a processing rule corresponding to the sub-tuple information; the destination control node 422 is further configured to add a control node number field and a service parameter field in the flow table of the source data node 411, where the control node number field is used to represent an index of a destination control node 422 corresponding to the source data node 411, and the service parameter field is used to represent an index corresponding to a processing result of the sub-tuple information of the service flow data packet.

Figure 12:
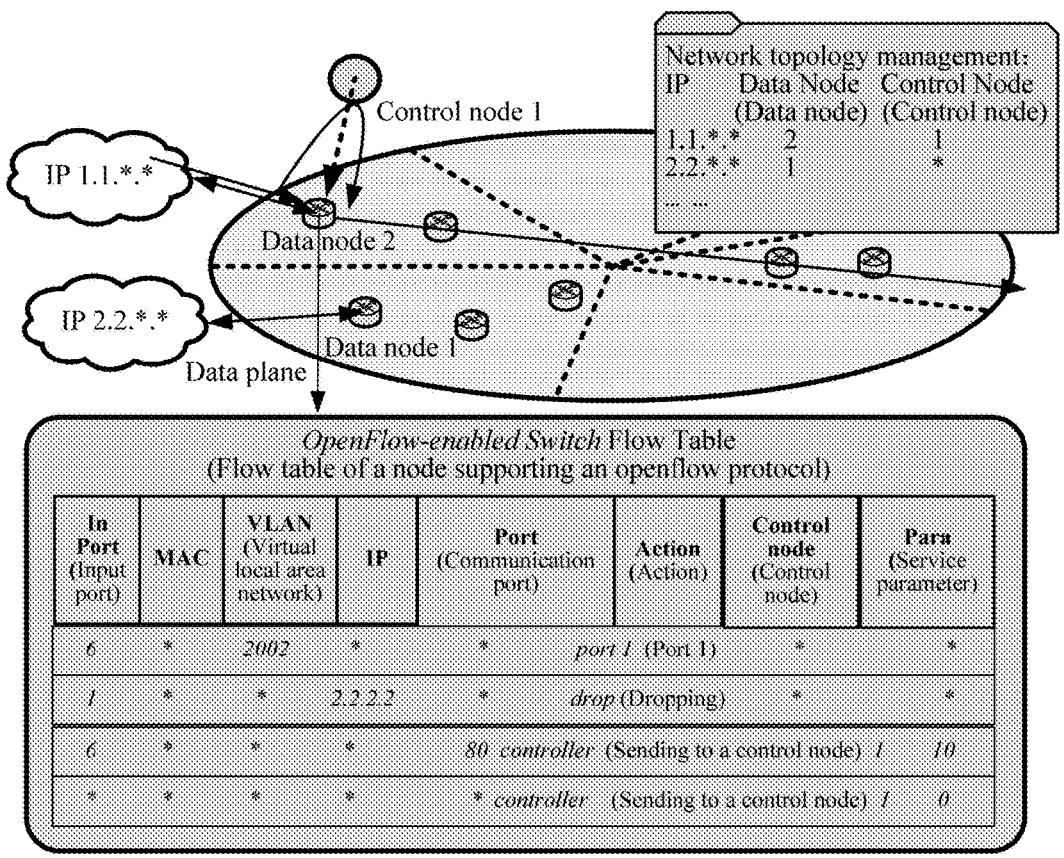
FIG. 12 is an exemplary diagram of a function implementation manner of a data plane in an SDN data processing system according to an embodiment of the present disclosure.

In an embodiment of the present disclosure, each data node device stores an initial flow table that can be read and written by the control node, the flow table is formed by flow rules, each flow rule includes a transmission layer attribute of a flow and a corresponding action, and a current OpenFlow device of Type 0 supports four simple actions: forwarding, dropping, local processing, and sending to a control node. As shown in FIG. 12, the embodiment of the present disclosure implements function supporting on multiple nodes of a control plane by adding a control node number Control node and a service parameter Para in the initial flow table. The control node number Control node and the service parameter Para may be added when the source control node modifies a flow table rule of the data node through an OpenFlow protocol; the control node number Control node is designated by the source control node, and represents a unique identifier of a corresponding destination control node for sending when the data node needs to send a current service flow to a destination control node; the service parameter Para provides related information of the service flow for accelerating service processing of the control node, and is generally matched with a corresponding policy condition or policy action according to the transmission layer information of the service flow, such as a transmission layer policy condition having been matched with the service flow or a rule hit by the service flow. It can be understood that, the modification on the flow table field stored in the data node is only an example for helping understanding of the embodiment of the present disclosure, and cannot be considered as a specific limit to the embodiment of the present disclosure. The adding of the flow table field may be preset on the data node, and may also be completed by a final data node. In some situations, only the control node number Control node may be added in the flow table of the data node, and the related information of the service flow provided by the service parameter Para may be obtained after the control node matches the preset policy matching rule with a service flow data packet A major objective of adding the service parameter Para is to accelerate the control node processing the related service flow information, thereby improving the efficiency of network running. An extended OpenFlow flow table structure extends, on the basis of the original flow table, two fields, namely, control node number (Control Node) and service parameter (Para). The control node number is used to uniquely determine a control node for sending, and the service parameter may be a middle matching result or a hit policy rule of the policy matching. The two fields are added by the control node into the flow table of the data node, the data node, when hitting the flow rule and sending upstream to a control node, sends a policy matching parameter to the control node through a TCP-options field, and the control node may accelerate the rule matching according to the parameter or execute a corresponding service.

As for a specific data service flow, generally, the first data packet of the data service flow matches with a default flow table rule, the data node sends the first data packet to the control node according to the default flow table rule, and the control node performs further rule matching according to the first data packet and then adds a flow table rule in the flow table of the data node according to a result of the rule matching. At this time, the control node extends two fields, namely, the control node number (Control Node) and the service parameter (Para), in the flow table of the data node, so that a subsequent data packet of the data service flow can match with the two newly added rules, and is forwarded from the data node according to the new rules. For specific rules, reference may be made to the example in FIG. 21.

In an embodiment of the present disclosure, the source data node is further configured to receive a third data packet, where both the third data packet and the first data packet belong to the service flow data packet, and a processing rule corresponding to sub-tuple information of the third data packet is the same as the processing rule corresponding to the sub-tuple information of the first data packet.

In an embodiment of the present disclosure, the source data node is further configured to determine, according to the flow table, a service parameter corresponding to the sub-tuple information from a processing rule record matching the sub-tuple information of the third data packet, where the service parameter is used to represent an index of an action parameter or a policy parameter to be executed for the third data packet; the source data node carries the service parameter in the third data packet and sends the third data packet to the destination control node; and the destination control node is further configured to determine, according to the service parameter and application layer information of the third data packet, the action parameter or policy parameter to be executed for the third data packet, so as to generate a fourth data packet.

Figure 22:
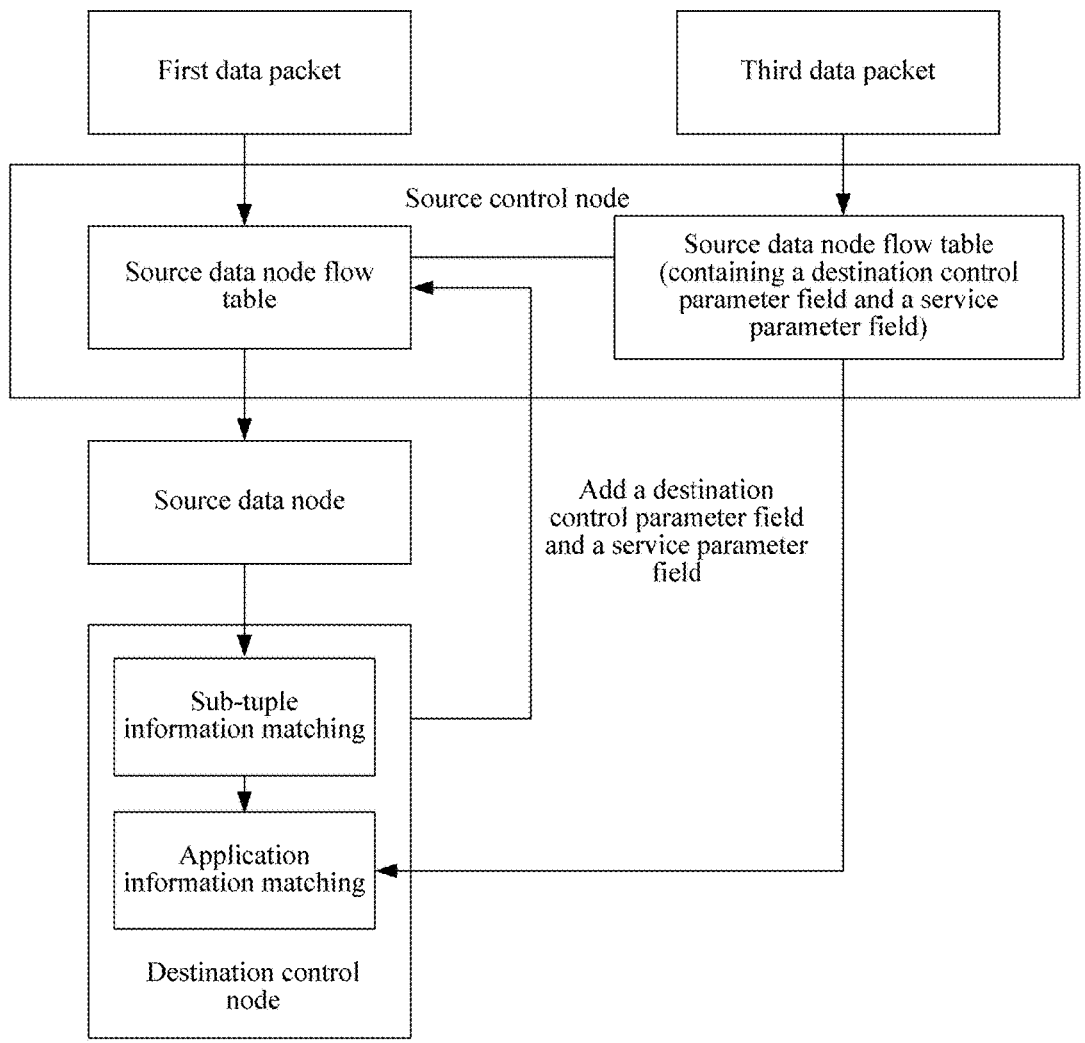
FIG. 22 is an exemplary diagram of different processing manners for a first data packet and a third data packet in an SDN data processing system according to an embodiment of the present disclosure.

A specific implementation manner may be shown in FIG. 22, and an operation for the first data packet matches with a default flow table rule, which is not described herein again. The third data packet having the processing rule of sub-tuple information the same as that of the first data packet has a somewhat different processing rule. The third data packet may be a data packet from a service flow the same as that of the first data packet, and may also be a service flow data packet having the same sub-tuple information required during corresponding flow table matching but having other sub-tuple information that is necessarily the same. The sub-tuple information is a subset of data packet tuple information, for example, the data packet may be formed by a 3-tuple, 5-tuple, or 10-tuple, and sub-tuple information may correspondingly have multiple combinations, for example, only 1 sub-tuple is selected from the 3-tuple, or 2 sub-tuples are selected. In an embodiment of the present disclosure, the sub-tuple information includes: a source/destination MAC address of the data packet, a source/destination IP address, a source/destination TCP port, a network port as ingress/egress of the data node (switch), and a VLAN label of the data packet, where the information can be obtained from the data packet. It can be understood that, the list of the sub-tuple information and the illustration of the third data packet are only explanations used to help understanding of the embodiment of the present disclosure, and cannot be considered as a specific limit to the embodiment of the present disclosure.

As shown in FIG. 22 and FIG. 21, the control node delivers to the data node a transmission layer condition (L4 layer condition, which can be understood as a condition matching with the sub-tuple information in a specific example), such as tcp.port=80 and ip.src=10.10.10.*, and marks for the delivered condition a number such as 0x0001 and 0x0002, that is, a service parameter field of the data node flow table (which can be understood as a result of sub-tuple information matching in a specific example). After the data node performs flow table matching for the third data packet to hit a flow table entry, the data node may directly send the third data packet to the destination control node according to a parameter field of the destination control node, without the need of forwarding through the source control node, where the third data packet, when being sent to the destination control node, carries a service parameter field value, and the service parameter field value corresponding to the third data packet is written into the flow table of the source control node when the destination control node performs policy matching on the first data packet, the third data packet adds the service parameter field value in the data packet to be carried to the control node, for example, a service parameter 0x0001 is carried to the control node, and the control node corresponds to a hit condition tcp.port=80 according to the number 0x0001, so as to directly perform further rule matching from a url node of the matching tree, without the need of starting from a root node of the matching tree to match the transmission layer of the data packet (L4 layer condition) again. In this manner, a matching operation of the destination control node may be accelerated, thereby improving the network processing efficiency.

In an embodiment of the present disclosure, the control node and the data node are connected by using at least two links, where one link is a data link for transmitting a data packet, and the other link is a control link for transmitting a control packet. The data node sends the data packet to the control node through the data link, and the control node modifies the flow table field of the data node through the control link.

The serving node may provide multiple control nodes with unified capabilities of processing an application layer service, such as the following capabilities:

a cache sharing capability: all control nodes may share cache information, and if data requested by one control node can be found in the cache, the cache data is obtained directly, thereby improving the network access performance;

link quality information sharing: all control nodes may share current link status information, and the control node may optimize routing selection according to the link state during routing distribution;

P2P protocol type peer address information sharing, which is capable of selecting to provide a peer address list in a local area network when requesting for a P2P type protocol, thereby improving a P2P type downloading speed; and network acceleration service message compression and decompression capability.

The various service processing capabilities are provided, in an open OpenAPI interface manner, to the control node for calling, and the various capabilities can be deployed in a multi-thread, multi-process, or multi-device manner; the same capability can share data through a sharing pool, the capability sharing pool may be in a form of a global variable, shared memory, or unified resource access device, and the control node may process the first data packet by calling the capabilities of the serving node, so as to generate the processed second data packet.

In the SDN network system 40 according to the embodiment in the first aspect of the present disclosure, in a hierarchical deployment manner of control nodes, an extended data node flow table structure, and a capability distribution method according to a policy rule, application layer service processing and capability sharing distribution in an SDN network are implemented, so that collaboration between nodes is improved to reduce the redundancy of multi-node processing in a network device, and the problems of unreasonable node capability distribution, capability dissymmetry, and capability non-aggregation are solved, thereby improving the service processing efficiency of the network; at the same time, the hierarchical deployment manner of control nodes solves the bottleneck of processing performance of the control nodes, and maintains the stability, reliability and scalability of the network.

Figure 5:
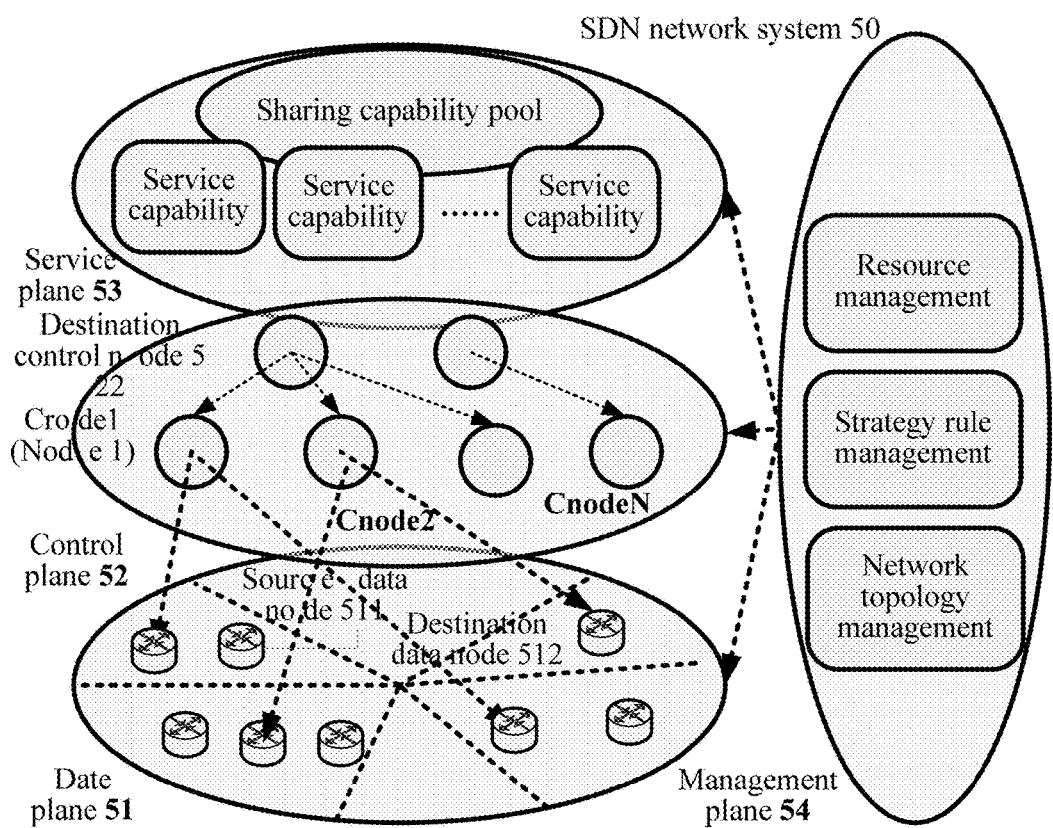
FIG. 5 is an architectural diagram of an SDN network system for data processing according to an embodiment in a first aspect of the present disclosure.

With reference to FIG. 5, the following describes an SDN network system 50 for data processing according to an embodiment in the first aspect of the present disclosure. As shown in FIG. 5, the SDN network system 50 includes: a data plane 51, where the data plane 51 includes at least two data nodes, and a data node receiving a service flow data packet is a source data node; a control plane 52, where the control plane 52 includes at least one control node, the control node is configured to manage the data nodes of the data plane according to a preset rule, and a source control node Cnode1 manages a source data node 511; the source data node 511 sends first request information to the source control node Cnode1, where the first request information includes a first data packet received by the source data node 511, and the first data packet includes a destination address of the first data packet; the source control node Cnode1 determines a destination control node 522 according to the destination address of the first data packet; the destination control node 522 generates a second data packet according to the first data packet and a preset policy rule; and the source data node 511 receives the second data packet sent by the destination control node 522, and sends the second data packet under management of the destination control node 522.

In an embodiment of the present disclosure, the control node is configured to manage the data nodes of the data plane according to the preset rule, including: group the data nodes of the data plane 51, so as to obtain at least two grouped data nodes; the control node adopts a hierarchical management manner, where a bottom layer control node manages one group of the grouped data nodes; an upper layer control node manages at least one of bottom layer control nodes, that is to say, the upper layer control node manages at least one group of the grouped data nodes; and a top layer control node manages all data nodes of the data plane 51.

Figure 11:
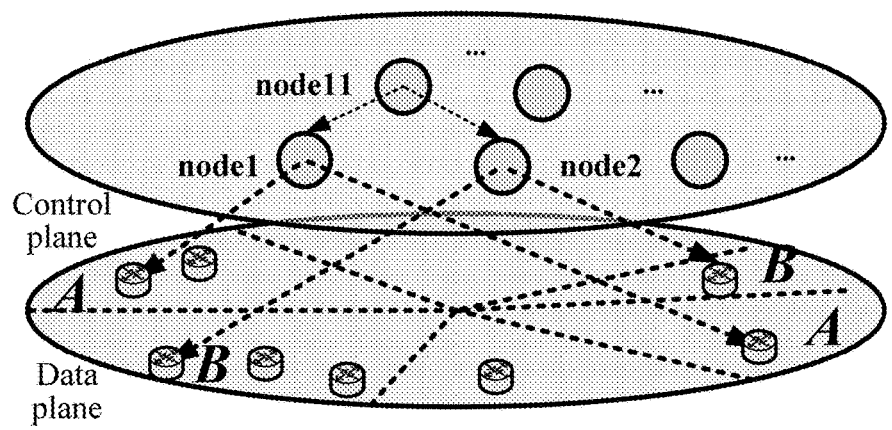
FIG. 11 is a schematic diagram of hierarchical management of a control node according to an embodiment of the present disclosure.

In an embodiment of the present disclosure, as shown in FIG. 11, the data plane includes multiple edge data nodes (a relay data node is not shown) and is divided into several areas in symmetric sectors. In FIG. 11, an area A and an area B are marked, the control plane is formed by multiple layers of control nodes, the control nodes node1 and node2 respectively manage edge data nodes and relay data nodes (not shown in the drawing) in the area A and the area B, a parent node node11 of the control nodes node1 and node2 manages all nodes in the area A and the area B, and likewise, the control nodes adopt a hierarchical manner, so that the parent node can manage all areas managed by all sub-nodes, and the uppermost layer control node can manage all data nodes of the data plane.

In an embodiment of the present disclosure, the source control node Cnode1 determining the destination control node 522 according to the destination address of the data packet includes: determining the destination data node 512 according to the destination address of the first data packet; and if the source control node Cnode1 manages the destination data node 512, determining the source control node Cnode1 as the destination control node 522. It can be understood that, for ease of description, this embodiment is not shown in FIG. 5.

In an embodiment of the present disclosure, if the source control node Cnode1 does not manage the destination data node 512, a second control node managing the source data node 511 and the destination data node 512 at the same time is determined as the destination control node 522.

In an embodiment of the present disclosure, the destination control node 522 generating a second data packet according to the first data packet and a matching policy rule includes: performing, by the destination control node 522, policy rule matching on the first data packet according to the matching policy rule, so as to obtain a result after the policy matching; and if the destination control node 522 can execute the result after the policy matching, generating, by the destination control node 522, the second data packet according to the result after the policy matching. The matching policy rule may be a corresponding action or parameter to be executed by the destination control node for the data packet, and may also be processing performed by the destination control node on the data packet according to a requirement of an application layer service.

In an embodiment of the present disclosure, the network system 50 further includes: a service plane 53, where the service plane 53 is configured to provide a service processing capability for the control plane 52; if the destination control node 522 cannot execute the result after the policy matching, the destination control node 522 sends, according to the result after the policy matching, capability request information to the service plane 53; the service plane 53 sends corresponding capability response information to the destination control node 522 in response to the capability request information; and the destination control node 522 generates the second data packet according to the capability response information. The service plane 53 may provide unified capabilities of processing an application layer service for multiple control nodes, the capabilities can correspondingly execute the result after the policy matching of the data packet, various service processing capabilities are provided, in an open interface manner OpenAPI for application programs, to the control node for calling, and the various capabilities can be deployed in a multi-thread, multi-process, or multi-device manner; the same capability can share data through a sharing pool, and the capability sharing pool may be in a form of a global variable, shared memory, or unified resource access device.

In an embodiment of the present disclosure, the network system 50 further includes: a management plane 54, where the management plane 54 is configured to manage at least one of a network topology of the data plane 51, a policy rule of the control plane 52, and the service processing capacity of the service plane 53. The network topology management includes a communication path between data plane nodes, port distribution, and an IP address section range of a client accessed by each data node. The policy rule management refers to a rule related to service processing that is configured by a user, and the policy rule is formed by a transmission layer or application layer policy condition and a corresponding service processing action. The management plane may implement the foregoing management manner during initial setting of the SDN network system, and may also perform setting or modification on the foregoing management manner according to a real-time situation of the SDN network or a user requirement when the SDN network system runs.

In the SDN network system 50 according to the embodiment in the second aspect of the present disclosure, in a hierarchical deployment manner of control nodes, an extended data node flow table structure, and a capability distribution method according to a policy rule, application layer service processing and capability sharing distribution in an SDN network are implemented, so that collaboration between nodes is improved to reduce the redundancy of multi-node processing in a network device, and the problems of unreasonable node capability distribution, capability dissymmetry, and capability non-aggregation are solved, thereby improving the service processing efficiency of the network; at the same time, the hierarchical deployment manner of control nodes solves the bottleneck of processing performance of the control nodes, and maintains the stability, reliability and scalability of the network.

Figure 6:
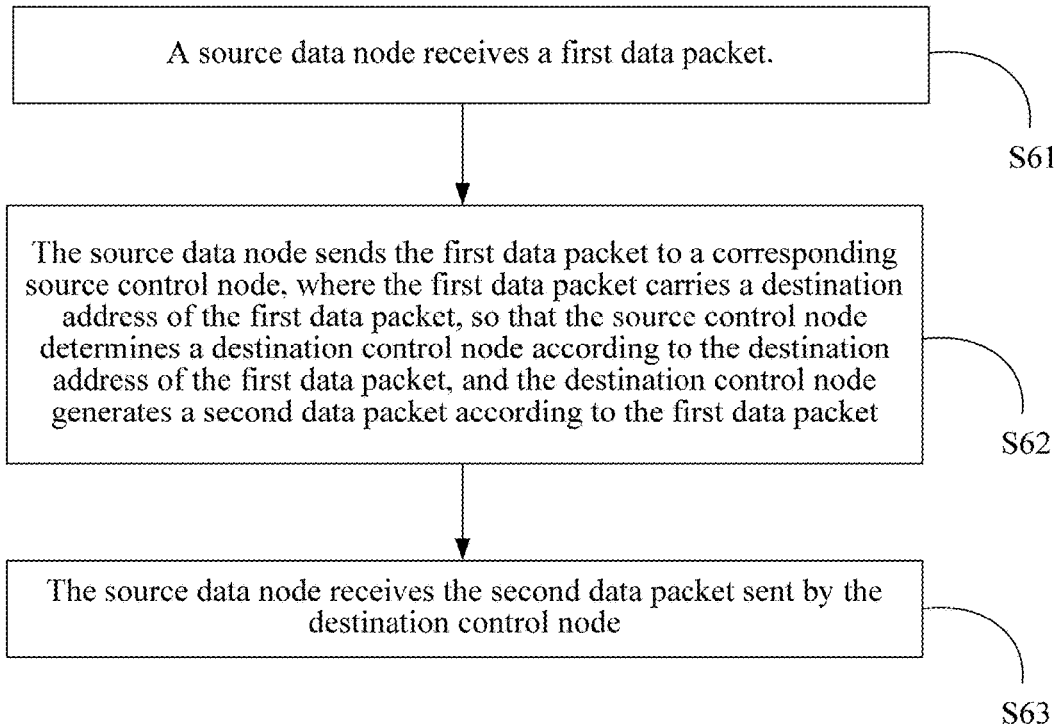
FIG. 6 is a flow chart of a method for data processing in an SDN network according to an embodiment in a second aspect of the present disclosure.

With reference to FIG. 6, the following describes a software defined network-based data processing method according to an embodiment in the second aspect of the present disclosure.

As shown in FIG. 6, the method includes:

S61: A source data node receives a first data packet.

S62: The source data node sends the first data packet to a corresponding source control node, where the first data packet carries a destination address of the first data packet, so that the source control node determines a destination control node according to the destination address of the first data packet, and the destination control node generates a second data packet according to the first data packet.

S63: The source data node receives the second data packet sent by the destination control node.

According to a software defined network (SDN)-based data processing method provided in the embodiment in the second aspect of the present disclosure, by performing, on a control node, various processing on a data packet received by a data node, the collaboration capability between nodes is improved and the redundancy of multi-node processing in a network device is reduced as well; moreover, the capability of the network device to process a service flow data packet is improved, thereby improving the service processing efficiency of the network.

Figure 7:
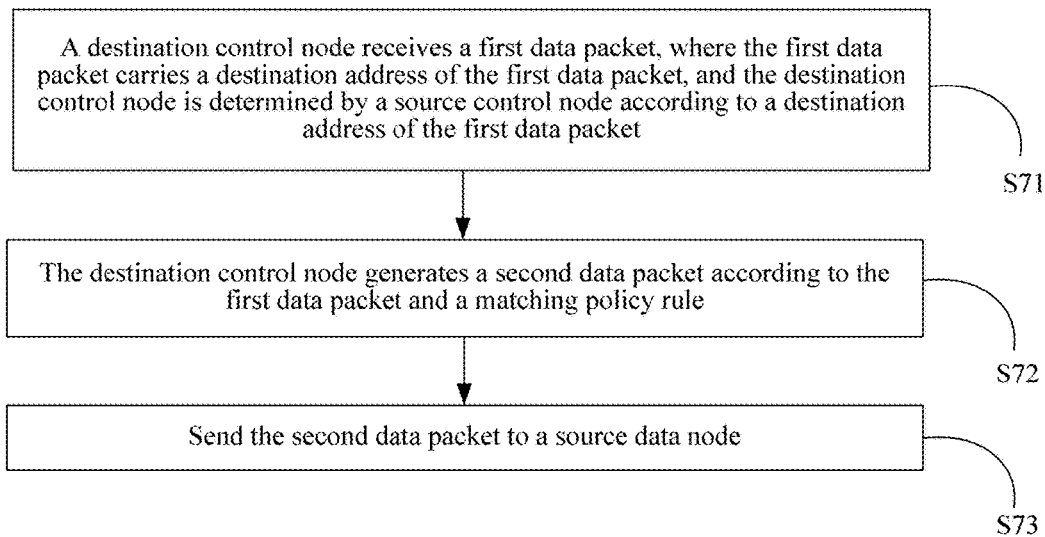
FIG. 7 is a flow chart of a method for data processing in an SDN network according to an embodiment in a third aspect of the present disclosure.

With reference to FIG. 7, the following describes a software defined network-based data processing method according to an embodiment in a third aspect of the present disclosure.

As shown in FIG. 7, the method includes:

S71: A destination control node receives a first data packet, where the first data packet carries a destination address of the first data packet, and the destination control node is determined by a source control node according to a destination address of the first data packet.

S72: The destination control node generates a second data packet according to the first data packet and a matching policy rule.

S73: Send the second data packet to a source data node.

According to a software defined network (SDN)-based data processing method provided in the embodiment in the third aspect of the present disclosure, by performing, on a control node, various processing on a data packet received by a data node, the collaboration capability between nodes is improved and the redundancy of multi-node processing in a network device is reduced as well; moreover, the capability of the network device to process a service flow data packet is improved, thereby improving the service processing efficiency of the network.

Figure 8:
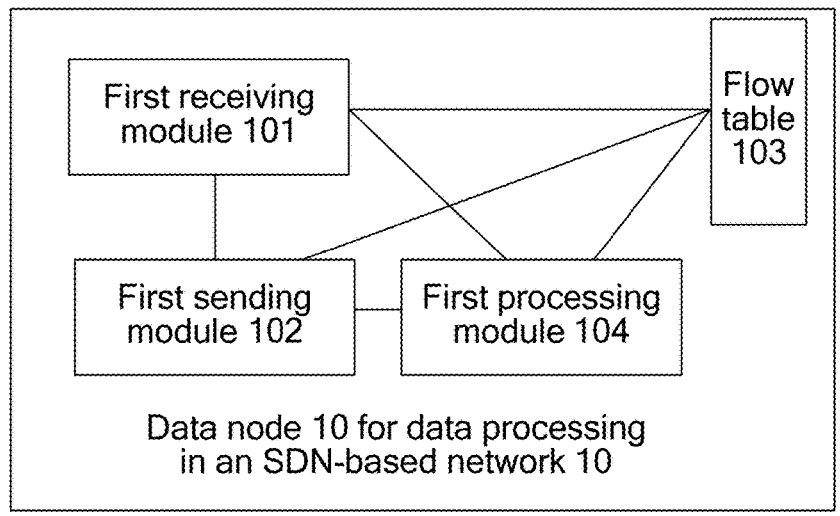
FIG. 8 is a flow chart of a device for data processing in an SDN network according to an embodiment in a fourth aspect of the present disclosure.

With reference to FIG. 8, the following describes a software defined network-based data node 10 according to an embodiment in a fourth aspect of the present disclosure. The data node 10 includes: a first receiving module 101 and a first sending module 102, where the first receiving module 101 is connected to the first sending module 102. The first receiving module 101 is configured to receive a first data packet, and the first sending module 102 is configured to send the first data packet received by the first receiving module 101 to a corresponding source control node, so that the source control node determines a destination control node according to a destination address of the first data packet, and the destination control node generates a second data packet according to the first data packet; and the first receiving module 101 is further configured to receive the second data packet sent by the destination control node.

According to a software defined network (SDN)-based data node 10 provided in an embodiment in the fourth aspect of the present disclosure, the collaboration capability between nodes is improved and the redundancy of multi-node processing in a network device is reduced as well; moreover, the capability of the network device to process a service flow data packet is improved, thereby improving the service processing efficiency of the network.

The data node 10 is in communication connection to an external device or a control node, so as to receive and process a data flow sent by the external device or the control node, and is configured to send related data information to the external device or the control node.

In an embodiment of the present disclosure, the data node 10 further includes: a flow table 103, where the flow table is used to store tuple information of a data packet and a processing rule corresponding to the tuple information. The sub-tuple information includes: a source/destination MAC address of the data packet, a source/destination IP address, a source/destination TCP port, a network port as ingress/egress of the data node (switch), and a VLAN label of the data packet, where the information can be obtained from the data packet.

The flow table is formed by flow rules, each flow rule includes a transmission layer attribute of a flow and a corresponding action, and a current openflow OpenFlow device of Type 0 supports four simple actions: forwarding, dropping, local processing, and sending to a control node.

In an embodiment of the present disclosure, if the first data packet satisfies the preset processing rule, the first sending module 102 sends first request information to the source control node.

In an embodiment of the present disclosure, the data node 10 further includes a first processing module 104, where the first processing module 104 is configured to obtain a destination control node according to the destination control node information received by the first receiving module 101; and the first processing module 104 is further configured to add a control node number field and a service parameter field in a flow table 103 according to the destination control node information, where the control node number field is used to represent a destination control node corresponding to the source data node, and the service parameter field is used to represent a result of a processing rule performed by the source data node on a data packet.

In an embodiment of the present disclosure, as shown in FIG. 12, the embodiment of the present disclosure implements function supporting of multiple nodes on the control plane by adding a control node number Control node and a service parameter Para in an initial flow table. The control node number Control node and the service parameter Para may be added when the source control node modifies a flow table rule of the data node through an OpenFlow protocol; the control node number Control node is designated by the source control node, and represents a unique identifier of a corresponding destination control node for sending when the data node requires sending the current service flow to a destination control node; the service parameter Para provides related information of the service flow for accelerating service processing of the control node, and is generally matched with a corresponding policy condition or policy action according to the transmission layer information of the service flow, such as a transmission layer policy condition having been matched with the service flow or a rule hit by the service flow. It can be understood that, the modification on the flow table field stored in the data node is only an example for helping understanding of the embodiment of the present disclosure, and cannot be considered as a specific limit to the embodiment of the present disclosure. The adding of the flow table field may be preset on the data node, and may also be completed by a final data node. In some situations, only the control node number Control node may be added in the flow table of the data node, and the related information of the service flow provided by the service parameter Para may be obtained by the control node according to the preset policy matching rule and after service flow data packet matching. The major objective of adding the service parameter Para is to accelerate the control node processing the related service flow information, thereby improving the efficiency of network running.

In an embodiment of the present disclosure, the adding the control node number field and the service parameter field in the flow table 103 includes that: the processing module 104 performs rule matching processing on the received data packet according to the flow table 103, and fills a result after the rule matching processing into the flow table 103; and the first sending module 102 sends the result after the rule matching processing of the data packet to the destination control node through the service parameter field of the flow table 103.

In an embodiment of the present disclosure, the control node number is used to uniquely determine a control node for sending, and the service parameter may be a middle matching result or a hit policy rule of the policy matching. The two fields are added by the control node into the flow table of the data node, the data node, when hitting the flow rule and sending to the control node, sends a policy matching parameter to the control node through a TCP-options field, and the destination control node may accelerate the rule matching according to the parameter or execute a corresponding service.

Figure 9:
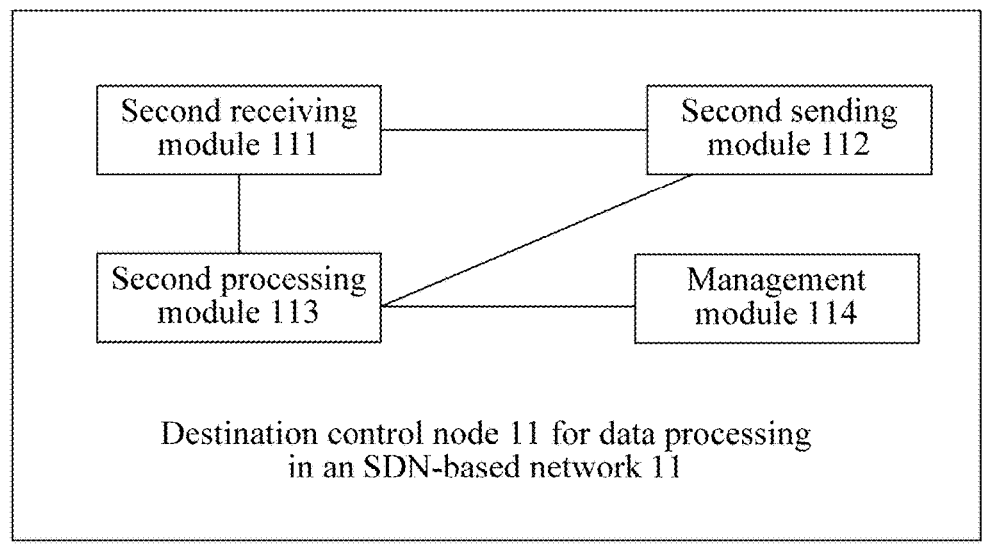
FIG. 9 is a flow chart of a device for data processing in an SDN network according to an embodiment in a fifth aspect of the present disclosure.

With reference to FIG. 9, the following describes a destination control node 11 for software defined network-based data processing provided in an embodiment in the fifth aspect of the present disclosure. The destination control node 11 includes: a second receiving module 111, where the second receiving module 111 is configured to receive a first data packet, the first data packet carries a destination address of the first data packet, and the destination control node is determined by a source control node according to the destination address of the first data packet;

a second processing module 113, configured to generate a second data packet according to the second data packet received by the second receiving module 111 and a matching policy rule; and a second sending module 112, configured to send the second data packet generated by the second processing module 113 to a source data node, where the source data node receives the first data packet, and corresponds to the source control node.

The second processing module 113 may be a processor or another device having a data processing capability.

According to a destination control node 11 for software defined network (SDN)-based data processing provided in an embodiment in the fifth aspect of the present disclosure, the collaboration capability between nodes is improved and the redundancy of multi-node processing in a network device is reduced as well; moreover, the capability of the network device to process a service flow data packet is improved, thereby improving the service processing efficiency of the network.

The destination control node 11 is in communication connection to the data node or the source control node. In an embodiment of the present disclosure, the destination control node 11 is also in communication connection to a serving node. The destination control node 11 is configured to receive and process a data flow sent by the data node, the source control node, and the serving node, and is configured to send related data information to the data node, the source control node, and the serving node.

In an embodiment of the present disclosure, the destination control node 11 further includes a second sending module 112, where the second sending module 112 is configured to send the second data packet generated by the processing module 113 to the source data node.

In an embodiment of the present disclosure, the destination control node 11 further includes a management module 114, where the management module 114 is configured to manage the source data node to send the second data packet.

In an embodiment of the present disclosure, the second sending module 112 is further configured to send response information to the source data node, where the response information is used to add a control node number field and a service parameter field in a flow table of the source data node, the control node number field is used to represent a destination control node corresponding to the source data node, and the service parameter field is used to represent a result of a processing rule performed by the source data node on a data packet.

In an embodiment of the present disclosure, the processing module 113 generating a second data packet according to the first data packet and a preset policy rule includes that: the processing module 113 performs policy rule matching on the first data packet according to the preset policy rule, so as to obtain a result after the policy matching; and if the processing module 113 can execute the result after the policy matching, the processing module 113 generates the second data packet according to a result after the policy matching. If the processing module 113 cannot execute the result after the policy matching, the second sending module 112 sends, according to a result after the policy matching executed by the processing module 113, capability request information to a serving node; and the processing module 113 generates the second data packet according to capability response information received by the second receiving module 111 from the serving node, where the capability response information is generated by the serving node in response to the corresponding capability request information.

The following describes the foregoing data processing method, node, and system in an SDN-based network system through specific implementation details. It should be noted that, for ease of illustration, some implementation manners used in the system may also be applied in the method or device, and some implementation manners used in the method may also be applied in the system or device. It can be understood that, the following implementation manner is only a specific example for helping understanding of the present disclosure, instead of a limit to the technical solution of the embodiment of the present disclosure, and the technical solution of the embodiment of the present disclosure further includes another manner that can be implemented by a person of ordinary skill in the art without creative efforts.

With reference to FIG. 5, the following describes a structure and functions of an SDN system for data processing according to an embodiment of the present disclosure.

As shown in FIG. 5, the SDN system for data processing, from the perspective of function division, includes four function planes: a data plane, a control plane, a service plane, and a management plane; and from the perspective of service data processing, includes three layers: a data layer, a control layer, and a service layer in sequence from bottom to top.

(1) The data plane is formed by data switch nodes, and a data node is compatible with existing SDN network node functions, and can support communication with a control node based on an OpenFlow protocol. The data plane is responsible for implementing a forwarding processing function of a service flow according to a flow table delivered by the control plane.

The data nodes of the data plane can be classified into two categories: an edge data node, which is a node connected to an external device and allows the external device to access a network, where this type of node is mainly responsible for performing data interaction with the external device, and both the foregoing source data node and the destination data node belong to the edge data node; and a relay data node, which is a node only connected to another internal data node, where the relay data node is only connected to a relay data node or an edge data node in the SDN network, is not in direct communication connection to the external device to generate data interaction, but is in indirect communication connection to the external device through the edge data node.

In an embodiment of the present disclosure, each data node device stores an initial flow table that can be read and written by the control node, the flow table is formed by flow rules, each flow rule includes a transmission layer attribute of a flow and a corresponding action, and a current OpenFlow device of Type 0 supports four simple actions: forwarding, dropping, local processing, and sending to the control node. As shown in FIG. 12, the embodiment of the present disclosure implements function supporting on multiple nodes of a control plane by adding a control node number Control node and a service parameter Para in the initial flow table. The control node number Control node and the service parameter Para may be added when the source control node modifies a flow table rule of the data node through an OpenFlow protocol; the control node number Control node is designated by the source control node, and represents a unique identifier of a corresponding destination control node for sending when the data node requires sending the current service flow to a destination control node; the service parameter Para provides related information of the service flow for accelerating service processing of the control node, and is generally matched with a corresponding policy condition or policy action according to the transmission layer information of the service flow, such as a transmission layer policy condition having been matched with the service flow or a rule hit by the service flow. It can be understood that, the modification on the flow table field stored in the data node is only an example for helping understanding of the embodiment of the present disclosure, and cannot be considered as a specific limit to the embodiment of the present disclosure. The adding of the flow table field may be preset on the data node, and may also be completed by a final data node. In some situations, only the control node number Control node may be added in the flow table of the data node, and the related information of service flow provided by the service parameter Para may be obtained by the control node according to the preset policy matching rule and after service flow data packet matching. The major objective of adding the service parameter Para is accelerating the control node processing the related service flow information, thereby improving the efficiency of network running.

Figure 10:
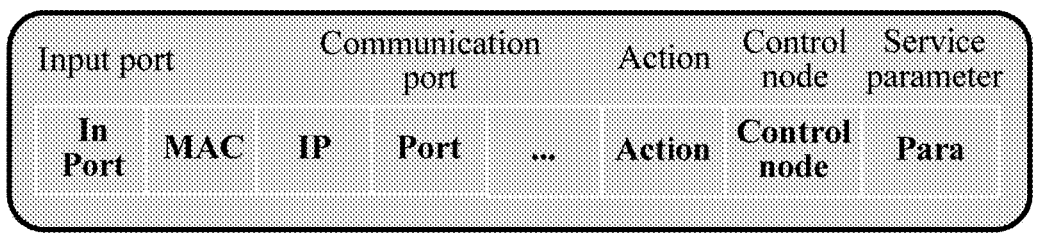
FIG. 10 is a schematic diagram of a specific structure of a flow table after a field is added in the flow table according to an embodiment of the present disclosure.

With reference to FIG. 12, the following describes a specific implementation manner of functions of a data plane according to an embodiment of the present disclosure. As shown in FIG. 12, because one data node may be in communication with multiple control nodes on the control plane, the data node needs to specify a unique identifier of sending to a control node, when a flow table action is send to controller, that is, sending to a control node. Therefore, as shown in FIG. 10, an extended OpenFlow flow table structure extends, on the basis of the original flow table, two fields, namely, a control node number (Control Node) field and a service parameter (Para) field. The control node number is used to uniquely determine a control node for sending, and the service parameter may be a middle matching result or a hit policy rule of policy matching. The two fields are added by the control node into the flow table of the data node, the data node, when hitting the flow rule and sending to the control node, sends a policy matching parameter to the control node through a TCP-options field, and the control node may accelerate the rule matching according to the parameter or execute a corresponding service.

A source control node for uploading, which is preset by the data node 2 for a service flow from an IP address range 1.1.*.* is a control node 1.

For a service flow entering from a port 6, if a VLAN ID thereof is 2002, a default matching rule of the data node 2 is forwarding the service flow to a port1, at this time, processing of an application layer service is not involved, and a processing action corresponding to the matching rule can be implemented on the data node 2.

For a service flow entering from the port 1, if an IP address thereof is 2.2.2.2, the default matching rule of the data node 2 is dropping a data packet of the service flow, at this time, the processing of an application layer service is not involved either, and the processing action corresponding to the matching rule can be implemented on the data node 2.

For a service flow entering from a port 6, if a communication port thereof is 80, the default matching rule of the data node 2 is sending a data packet of the service flow to a control node, a number of the corresponding control node is 1, that is, sending the data packet to the control node 1, and a value of the service parameter Para is 10, that is, hitting a policy rule corresponding to 10, for example, the policy rule may be as follows:

IF port=80 && url=www.xxx.com THEN redirect to url=www.yyy.com where the condition of port=80 corresponds to the service parameter 10.

For another service flow, a matching rule of the data node 2 is sending a data packet of the service flow to a control node, a number of the corresponding control node is 1, that is, sending the data packet to the control node 1, and a value of the service parameter Para is 0, that is, hitting a policy rule corresponding to 0, for example, the policy rule may be, for example, a rule as follows:

IF url=www.xxx.com THEN redirect to url=www.zzz.com.

The policy rule is configured by a network administrator through rule management of a management plane, the control node delivers, according to a condition of whether the rule specifically involves a transmission layer or an application layer (an IF part of the policy rule), a flow table parameter to the data node. For example, in the example corresponding to the service parameter 10, the information about the data node being only matched with the data packet port 80 can be sent to the control node through the service parameter 10, the control node learns, according to the service parameter, that the data node has been matched with the data packet satisfaction condition port=80, so the control node only needs to continuously match to check whether a url satisfies a condition of url=www.xxx.com, without the need of further matching a port number of the data packet. This example differs from the example where the value of the service parameter is 0 that, the control node distinguishes, according to the service parameters 0 and 10, whether the condition of port=80 is matched.

It can be understood that, the foregoing embodiment is only an example for helping understanding of the embodiment of the present disclosure, and cannot be considered as a specific limit to the embodiment of the present disclosure. The embodiment of the present disclosure may further include another manner that can be implemented by a person of ordinary skill in the art without creative efforts.

(2) In addition to being compatible with the existing transmission layer service functions of the SDN network, such as traffic control, routing distribution, and load balancing, the control plane is also responsible for implementing application layer services, such as protocol identification and parsing, policy rule matching, and sending an action to the data node according to a rule matching result and calling a corresponding service function.

In the present disclosure, the control plane adopts a manner of hierarchically deploying multiple nodes, and according to a location of the data node and IP address information of a service flow, classifies a service flow managed by each control node by area and flow. Moreover, a principle that one service flow is always managed by the same control node is satisfied.

Figure 14:
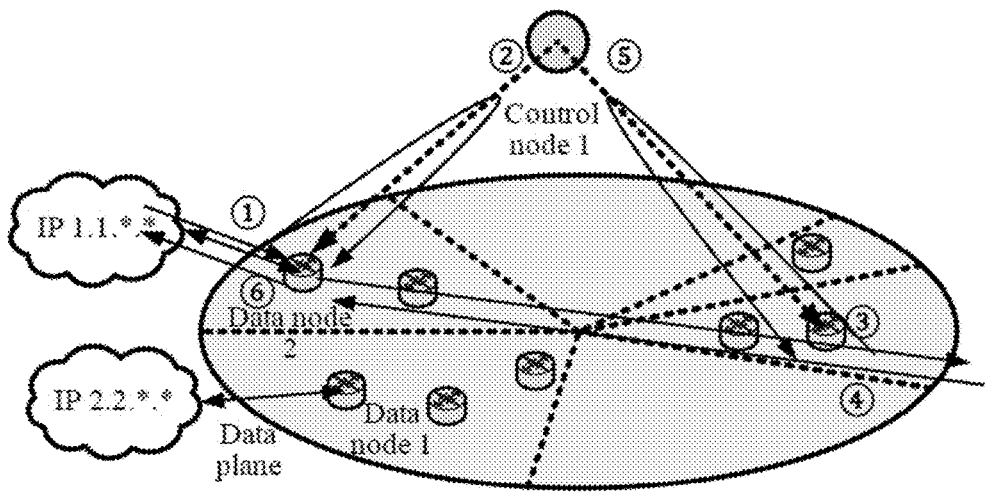
FIG. 14 is a schematic diagram of performing service processing on a service flow according to an embodiment of the present disclosure.

In an embodiment of the present disclosure, the control plane divides areas of the data plane in symmetric sectors, and each control node can manage an edge data node and all relay data nodes in one symmetric area. A method of managing control nodes by area is shown in FIG. 11. The data plane includes multiple edge data nodes (a relay data node is not shown) and is divided into several areas in symmetric sectors. In FIG. 14, an area A and an area B are marked, the control plane is formed by multiple layers of control nodes, the control nodes node1 and node2 respectively manage edge data nodes and relay data nodes in the area A and the area B, a parent node node11 of the control nodes node1 and node2 manages all nodes in the area A and the area B, and likewise, the control nodes adopt the hierarchical manner, so that the parent node can manage all areas managed by all sub-nodes, and the uppermost layer control node can manage all data nodes of the data plane.

Figure 15:
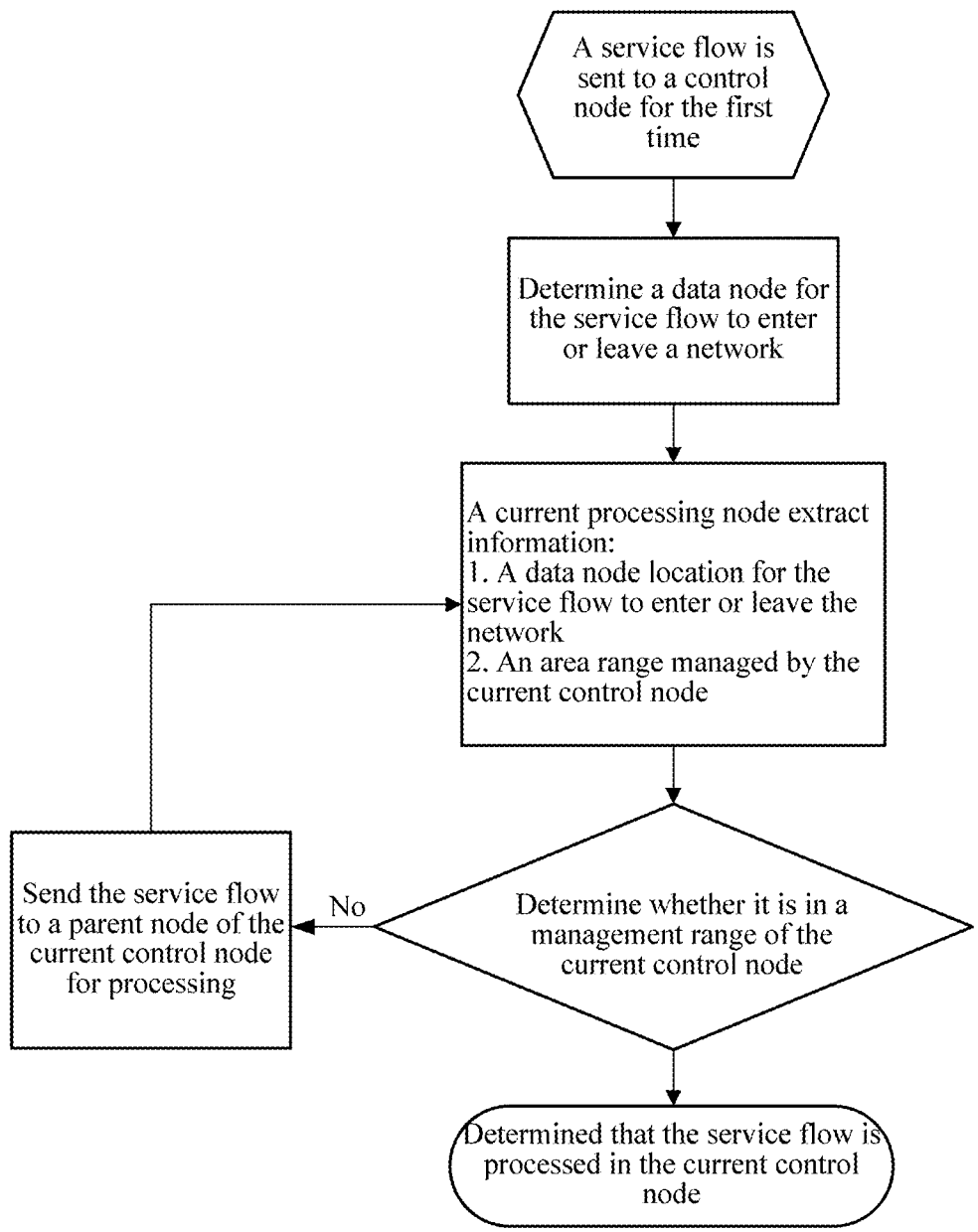
FIG. 15 is a flow chart of determining a destination control node according to an embodiment of the present disclosure.

The specific procedure of determining a control node for managing a service flow is shown in FIG. 15. When receiving the service flow sent by a data node for the first time, the control node determines, according to a destination IP address of the service flow and a routing selection result, areas where data nodes of the data plane for the service flow to enter the network and exit the network are located. If a location of the data node for the service to exit the network and that of the data node for the service flow to enter the network are not in a management area of the current control node, the control node sends the service flow to an upper layer control node for processing, and accordingly, the service flow is finally determined to be managed by a certain control node according to the areas where the nodes for entering and leaving the network are located.

The method for dividing control nodes according to the IP address of the service flow allows one data node to be managed by multiple control nodes at the same time, and the data node may select a corresponding control node according to an IP address range of the service flow.

Figure 13:
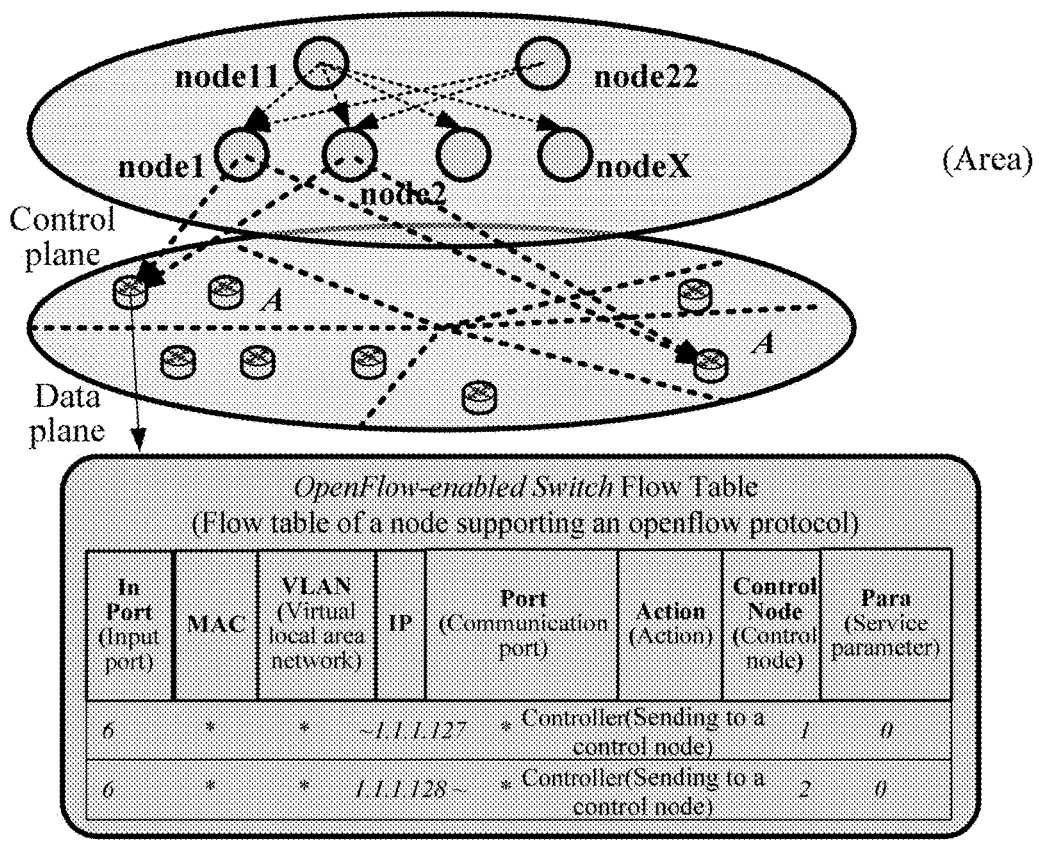
FIG. 13 is a schematic diagram of implementation of determining an upper layer control node according to an IP address range according to an embodiment of the present disclosure.

In an embodiment of the present disclosure, as shown in FIG. 13, the data node selects the corresponding control node according to the IP address range of the service flow in the following manner:

The control plane is formed by multiple control nodes, the control node divides the controlled data nodes according to symmetric sector areas, the control nodes node1 and node2 control the data nodes in the range of the area A at the same time, and the data nodes distribute service flows to different control nodes according to a source IP, where a service flow having an IP ranging from 1.1.1.1 to 1.1.1.127 corresponds to a control node number 1 (corresponding to the control node node1) in the flow table, and a service flow having an IP ranging from 1.1.1.128 to 1.1.1.254 corresponds to a control node number 2 (corresponding to the control node node2) in the flow table. The control node numbers corresponding to the data nodes in terms of different IP address ranges may be preset in the flow table of the data nodes. It can be understood that, the foregoing embodiment is only an example for understanding the embodiment of the present disclosure, and cannot be considered as a specific limit to the embodiment of the present disclosure. As shown in FIG. 15, an upper layer control node may also be determined according to different IP address ranges, where for a service flow having an IP ranging from 1.1.1.1 to 1.1.1.127, an upper layer control node thereof is a node11, and a service flow having an IP ranging from 1.1.1.128 to 1.1.1.254 corresponds to an upper layer control node node22.

(3) A service plane may provide unified capabilities of processing an application layer service for multiple control nodes, such as the following capabilities:

a cache sharing capability: all control nodes may share cache information, and if data requested by one control node can be found in the cache, the cache data is obtained directly, thereby improving the network access performance;

link quality information sharing: all control nodes may share current link status information, and the control node may optimize routing selection according to the link state during routing distribution;

P2P protocol type peer address information sharing, which is capable of selecting to provide a peer address list in a local area network when requesting for a P2P type protocol, thereby improving a P2P type downloading speed; and network acceleration service message compression and decompression capability.

Various service processing capabilities are provided, in an open OpenAPI interface manner, to the control node for calling, and the various capabilities can be deployed in a multi-thread, multi-process, or multi-device manner; the same capability can share data through a sharing pool, and the capability sharing pool may be in a form of a global variable, shared memory, or unified resource access device.

In an embodiment of the present disclosure, the capability execution procedure of the service plane includes that: the control node registers a certain capability with the service plane according to rule configuration, the service plane copies the capability for the control node, and at the same time, the control node specifies a capability execution point in the service processing procedure; and when the control node is matched with a certain service processing action, the capability execution point in a processing link is activated to call, through an open interface, the service processing capability of the service plane.

In an embodiment of the present disclosure, the capability execution procedure of the service plane includes: (1) initialization registration stage, where the control node is started, according to a universal set of service rules currently on the control node, for example, cache sharing is configured on the current control node, the control node first performs capability registration with the service plane, the service plane, after receiving a capability registration request of the control node, distributes corresponding resources to the control node, for example, distributes data storage space and performs an initialization operation on information of the currently registered node, and at the same time, the control node specifies a capability execution point in an internal processing procedure, for example, distributes a capability scheduling point at an action execution stage after hitting a rule. (2) Capability activation at the running stage, when the control node needs to schedule a certain capability of the service layer at the capability scheduling point during a procedure of executing service processing, the control node initiates a capability execution request to the service plane, for example, the control nodes initiates a request for caching information to the service plane in a cache capability sharing service, the service plane, after receiving the execution request of the control node, searches a sharing cache pool according to an index of the cache content requested by the control node, returns cache data to the control node if the cache data is found, and marks as finding a cache, and if the service plane does not find the cache data in the sharing cache pool, returns null, and marks as not finding the cache data, and the control node continues the service processing according to a returned result of the capability execution of the service plane. (3) Exit to cancel registration stage, the control node needs to cancel registration with the service plane when exiting through normal closing, the control node initiates a registration cancellation request message to the service plane, the service plane withdraws the distributed resources according to the request message of the control node, for example, withdraws the distributed space, and executes an operation of clearing registration information of the control node.

It can be understood that, the foregoing capability execution procedure of the service plane is only a specific example for helping understanding of the embodiment of the present disclosure, instead of a specific limit to the embodiment of the present disclosure. Multiple processing capabilities and service manners can be set for the service plane in advance, without the need of registering with the service plane by the control node. The embodiment of the service plane capabilities may further include another manner that can be implemented by a person of ordinary skill in the art without creative efforts.

(4) A management plane is responsible for data plane network topology structure management, policy rule management, and service plane resource management. The network topology management includes a communication path between data plane nodes, port distribution, and an IP address section range of a client accessed by each data node. The policy rule management refers to a rule related to service processing that is configured by a user, and the policy rule is formed by a transmission layer or application layer policy condition and a corresponding service processing action. The management plane may implement the foregoing management manner during initial setting of the SDN network system, and may also perform setting or modification on the foregoing management manner according to a real-time situation of the SDN network or a user requirement when the SDN network system runs.

In an embodiment of the present disclosure, the management plane is responsible for data plane network structure management, data node and control node connection topology management, policy rule management, and service plane resource management. The management plane is a configuration management interface provided for a network administrator. At an initial stage of system booting, the network administrator delivers topology information to every control node through the management plane, so as to provide link connection information for subsequent routing distribution of the control node. The policy rule information is formed by multiple rules, each policy rule is formed by L1-4 layers or an application layer condition and a corresponding service action, for example, rule 1: IF (condition) IP=10.10.10.* and url=www.abcd.com/* service flow, THEN (action) redirect url=www.xxxx.com/portal executes a redirection action, where IP=10.10.10.* is a condition forming transmission layer information, and url=is a condition forming L7 layer information; the management plane provides a rule configuration interface for the network administrator, the network administrator configures a policy rule set and delivers the rule set to the control node through the management plane, and the control node completes initialization according to the distributed rule set, including registering capability with the service plane.

As shown in FIG. 14, in an embodiment of the present disclosure, capabilities of the data node and the control node are distributed by means of centralized management of policy rules of the management plane and according to the configuration policy rule of the user, and specifically, six service processing points are divided according to a request or response type of the service flow and locations for the service flow to enter and exit the network: ① a data node where a request message enters the network; ② a control node which the request message enters; ③ a data node where the request message exits the network; ④ a data node where a response message enters the network, ⑤ a control node which the response message enters; and ⑥ a data node where the response message exits the network. The service processing points are distributed and a corresponding capability is allocated for the node according to a condition type and an action type of the policy rule, and the distribution method is shown in the drawing. From the physical perspective, ① and ⑥ correspond to the same physical data node, ② and ⑤ correspond to the same physical control node, and ③ and ④ corresponding to the same physical data node.

Example 1: the policy condition is a condition depending on transmission layer message information, and the policy action is a non-service action such as dropping or forwarding, so that a transmission layer condition corresponding to the data node needs to be allocated at the locations ① and ④ to serve as a tuple of an OpenFlow flow table, where an action of the flow table is the policy action (forwarding or dropping).

Example 2: the policy condition is a condition depending on transmission layer information of a request message, and the policy action is a certain type of service processing, so that a transmission layer condition corresponding to the data node needs to be allocated at the location ① to serve as a tuple of an OpenFlow flow table, where an action of the flow table is send to controller, that is, sending to a control node, Control Node is a number of a control node at the location ②, a policy parameter is an index of a corresponding service action, and at the same time, a service processing capability corresponding to the control node policy action needs to be allocated at the location ②. The control node may be directly indexed, according to the policy parameter of the message sent by the data node, to corresponding service processing that needs to be executed.

Example 3: the policy condition is a condition depending on transmission layer and application layer information of a request message, and the policy action is a certain type of service processing, so that a transmission layer condition corresponding to the data node needs to be allocated at the location ④ to serve as a tuple of an OpenFlow flow table, where an action of the flow table is sendto controller, that is, sending to a control node, Control Node is a number of a control node at the location ⑤, a policy parameter is a middle result of policy matching of the transmission layer information, and at the same time, Layer 7 protocol identification and parsing, rule matching, and a corresponding service processing capability of the control node need to be allocated at the location ⑤. The control node obtains, according to the policy parameter of the message sent by the data node, the middle result of transmission layer condition matching of the message, completes the policy matching in combination with the message information obtained through application layer processing, and executes corresponding service processing according to a result of the policy matching.

Figure 16:
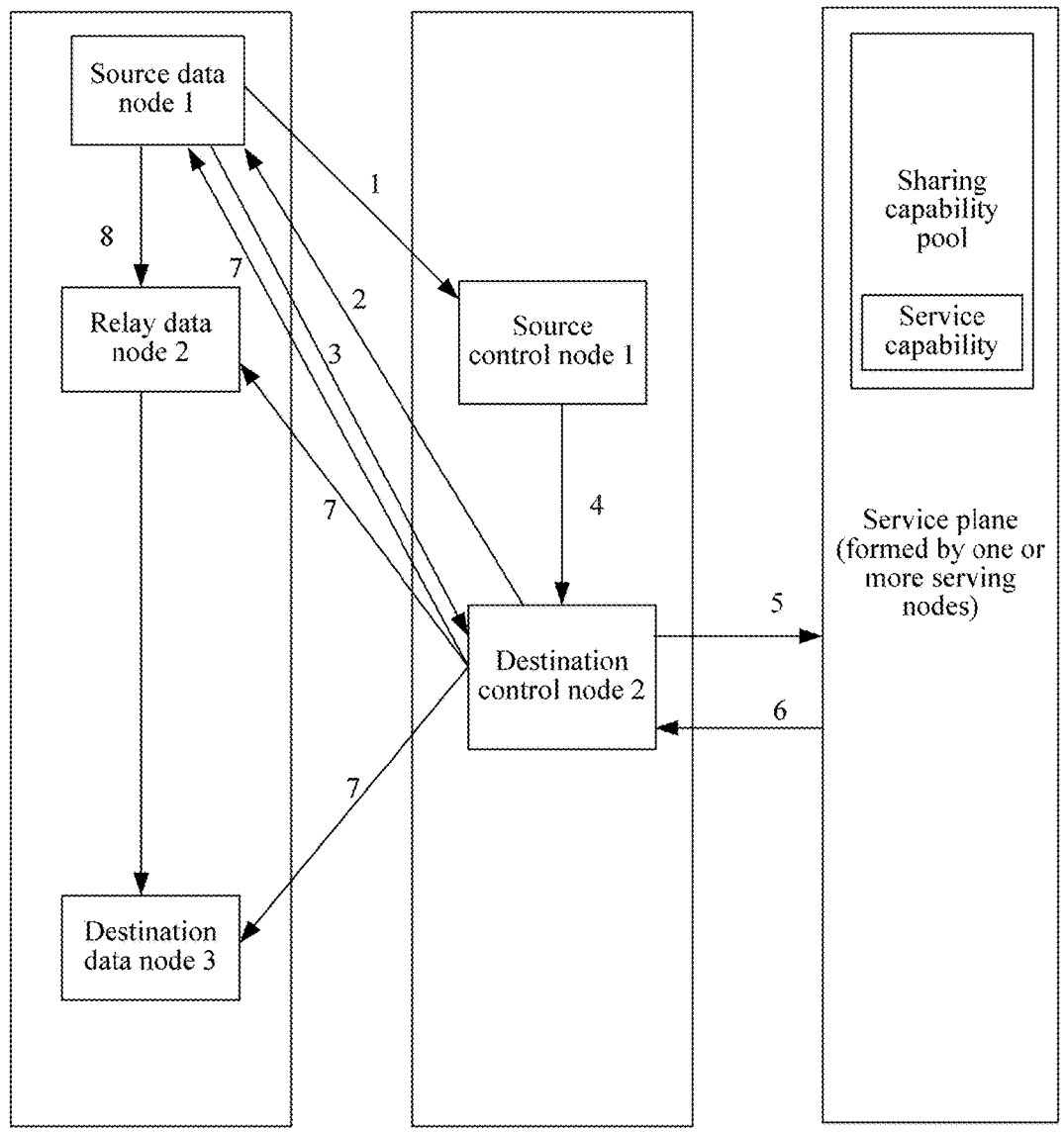
FIG. 16 is a schematic diagram of a data flow direction of an SDN network system according to an embodiment of the present disclosure.

With reference to FIG. 16, the following describes a data flow of an SDN system for data processing according to an embodiment of the present disclosure.

As shown in FIG. 16, in an SDN network system for data processing according to an embodiment of the present disclosure, after a source data node receives a service flow data packet, the source data node first performs flow table matching of a transmission layer on the data packet, and executes a corresponding action according to a hit rule. If the hit matching rule is sending to a control node, execute 1.

The source data node 1 sends data information to a source control node 1, where the data information includes a first data packet of the service flow received by the source data node. The source control node 1 determines a destination control node 2 according to a destination IP address of the first data packet of the service flow.

The destination control node 2 modifies a flow table rule of the source data node through an OpenFlow protocol according to the data information sent by the source data node 1, and adds a control node number and a service parameter field. The control node number is a unique mark of a corresponding control node for sending when the current service flow needs to be sent to a control node. The service parameter field is delivered by the destination control node 2 to the source data node 1, so as to mark a policy rule index corresponding to a flow table entry in the source data node.

The source data node 1 performs rule matching on the data packet according to the flow table rule, is finally matched with a flow table rule R, and performs forwarding, local processing, or sending to a control node according to an action parameter in the flow table rule R, where if the action is sending to a control node, a control node for sending is selected according to a number of the control node for sending in the flow table rule R, and the service parameter field in the flow table rule R is filled in an extended field of the data packet, for example, the service parameter is carried to the control node through a TCP-options field, the service parameter field is written by the destination control node 2 into the flow table of the data node 1, and the control node may accelerate the service rule matching procedure through the service parameter carried in the data packet.

An initial control node 1 sends the received data packet of the service flow to a final data node 2 for the final data node 2 to process, and the service parameter field is added to the TCP-options field of the extended field along with the data packet to be carried to the destination control node 2.

The service plane can provide unified capabilities of processing an application layer service for the destination control node 2, various service processing capabilities can be provided, in an open OpenAPI interface manner, for calling by the destination control node 2, and the destination control node 2 sends request information to the service plane according to the data packet received from the source control node 1, so as to request calling the service capability required for processing the data packet.

The service plane sends the service capability called by the destination control node 2 to the destination control node 2, and the destination control node 2 performs processing on the data packet of the service flow by using the service capability, so as to obtain the processed service flow data packet.

The destination control node 2 sends the processed service flow data packet to the source data node 1, and at the same time, the destination control node 2 allocates a route for the service flow according to a current network state and in combination with a certain bandwidth and a routing distribution policy, and delivers the rule to a corresponding relay data node through an OpenFlow protocol, so as to add the rule corresponding to the flow in a flow table of the relay data node.

The source data node 1 sends the service flow data packet processed by the destination control node 2 to a destination data node 3 through one or more relay data nodes 2.

It can be understood that, the foregoing embodiment is only a specific example for helping understanding of the embodiment of the present disclosure, and cannot be considered as a limit to the embodiment of the present disclosure, the foregoing data numbers of 1-8 cannot be considered as a limit to the sequence of the steps of data flow direction transmission, where a part of the steps may have exchanged orders, or may be executed in another manner that can be implemented by a person of ordinary skill in the art without creative efforts.

With reference to FIG. 17 to FIG. 20, the following describes several specific implementation scenarios of an embodiment of the present disclosure.

Figure 17:
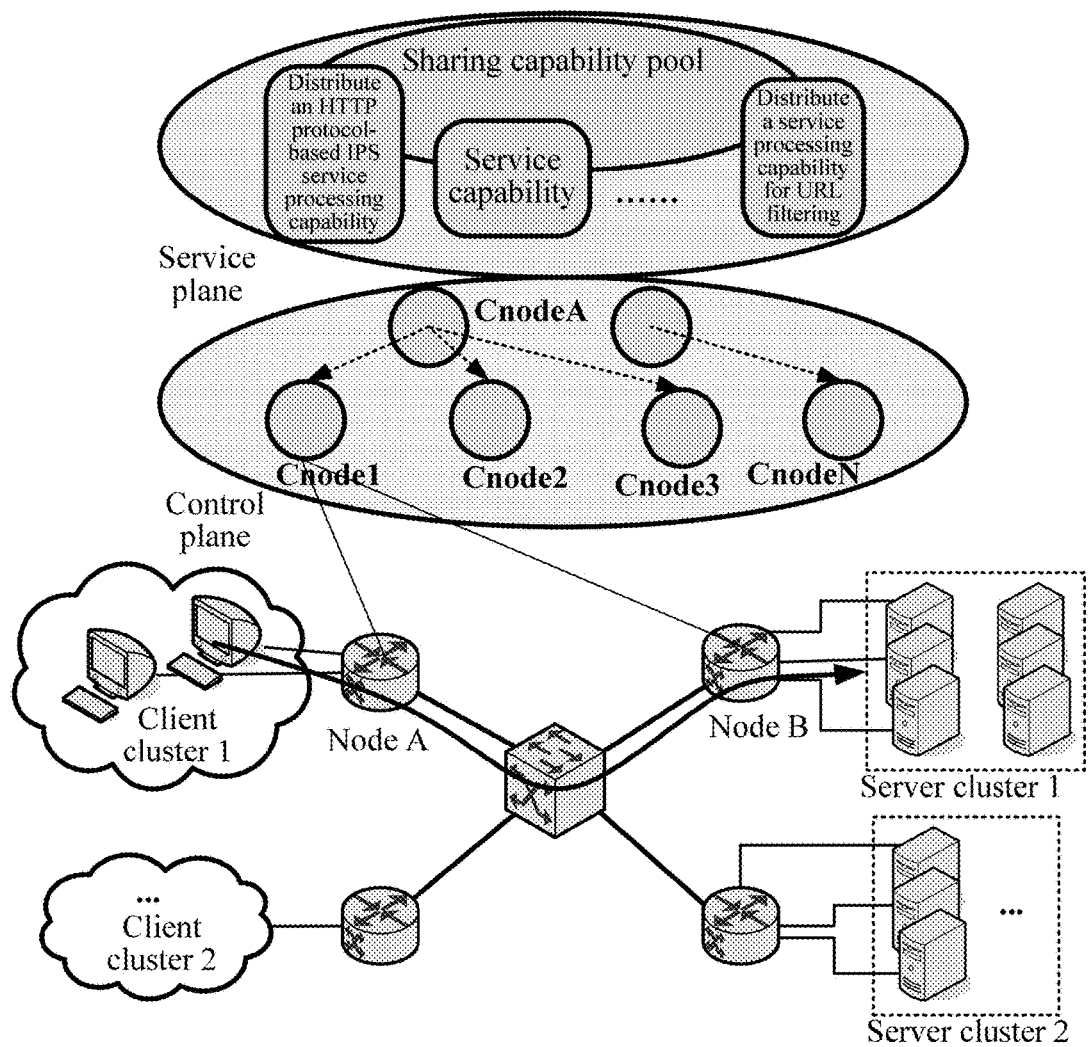
FIG. 17 is a specific implementation scenario of an SDN data processing system according to an embodiment of the present disclosure.

As shown in FIG. 17, a data message of a certain service flow in a client cluster 1 enters an SDN network from a data node A, and the data message is transmitted through multiple relay data nodes (not shown in the drawing), and reaches a server cluster 1 through a data node B.

Both the data node A and the data node B are managed by a control node Cnode1, and the control node Cnode1 maintains flow tables of the data node A and the data node B through an OpenFlow protocol. (1) A service flow data packet sent by a client first passes the data node A; (2) when a first data packet (first packet) of the service flow reaches the data node A, the data node A obtains, by performing flow table matching on the first data packet, an action corresponding to a default flow table entry, that is, sendto controller, a default control node number Cnode1, and a default service parameter being null; (3) the data node A sends the data packet to the default control node Cnode1 according to the control node number, and the control node Cnode1 performs policy rule matching on the data packet. Assuming that a network administrator configures a policy rule 1: IF ip=11.11.11.* && protocol=HTTP THEN IPS check; a rule 2: IF ip=11.11.11.* && url=www.xxx.com THEN block; a result of the policy matching of the data packet is satisfying a number 10 condition of ip=11.11.11.*, the control node Cnode1 delivers an additional flow table entry I to the data node A, where a content of the flow table entry I is a service parameter 10 corresponding to a data flow having ip=11.11.11.* in a tuple, and it is determined according to a destination address of the data packet that a data node for the data packet to exit the network is B; because both the data node A and the data node B are managed by the control node Cnode1, the control node Cnode1 is determined as a destination control node, and a control node number delivered by the control node A to the data node flow table entry I is a node number of the control node; (4) the control node Cnode1 updates flow tables of various relay data nodes on a data flow route and the data node B through the OpenFlow protocol; (5) the control node Cnode1 forwards the data packet to a data node, so that each data node performs matching and forwarding on the data packet according to a flow table rule of the data node, and finally, the first data packet exits the network through the data node B to reach the server; and (6) the data node processes a subsequent data packet on the service flow according to the flow table rule.

The sharing capability pool of the service plane contains a data packet identification and parsing function aimed at an HTTP (hypertext transport protocol, Hypertext Transport Protocol) protocol, and a URL (Uniform Resource Locator, uniform resource locator) matching capability.

The control node Cnode1 registers a service processing capability with the service plane on the basis of a preset matching rule, and when it is required to match a certain service processing action, the control node Cnode1 may activate the service processing capability of the service plane through an open interface. If protocol identification and parsing or URL matching processing need to be performed on the service flow, the control node Cnode1 calls the service processing capability of the service plane to process the service flow, and send the processed data packet to the data node A.

In the foregoing example, (7) when the control node Cnode1 performs policy matching on the subsequent message of the service flow, if a service parameter carried in a data packet sent by the data node is 10, that is, ip=11.11.11.* is satisfied, the control node Cnode1 needs to further perform matching on the data packet to check whether a condition url=www.xxx.com and a condition protocol=HTTP are satisfied, and the control node Cnode1 first activates the protocol identification and parsing function to the service plane; (8) the service plane, when receiving a capability request of the control node, performs identification and parsing processing on the packet, and returns a result to the control node; (9) the control node determines that if the identification and parsing result is protocol=HTTP, a URL matching capability is further activated, the service plane continues to complete the URL matching on the data packet and returns a result to the control node; (10) the control node completes the policy matching according to the result returned by the service plane, and executes a response policy action, for example, if an execution action block block of a rule 2 is matched, the control node updates a flow table entry of the data node, and sets an action corresponding to the service flow in the data node A as block. It can be understood that, the foregoing embodiment is only an example for helping understanding of the embodiment of the present disclosure, instead of a specific limit to the embodiment of the present disclosure.

Figure 18:
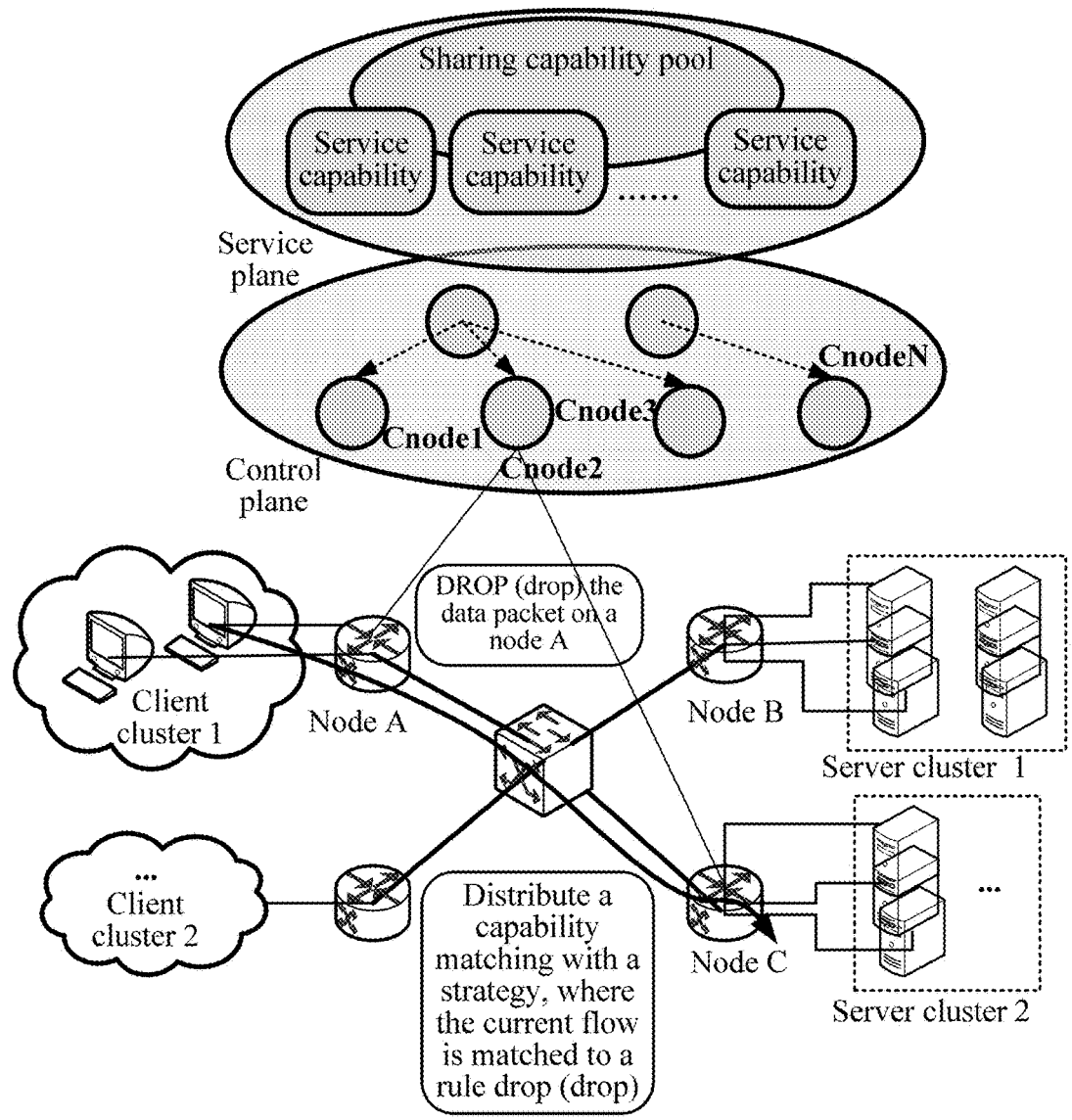
FIG. 18 is a second specific implementation scenario of an SDN data processing system according to an embodiment of the present disclosure.

As shown in FIG. 18, a data massage of a certain service flow in a client cluster 1 enters an SDN network from a data node A, the data message is transmitted through multiple relay data nodes (not shown in the drawing), and reaches a server cluster 2 through a data node C. Both the data node A and the data node C are managed by a node Cnode2, and the data node A and the data node C are in communication connection with the node Cnode2 through an OpenFlow protocol.

Like the foregoing example, the data node A performs flow table matching on a first packet of a service flow (assuming that a source IP is 11.11.11.11), hits a default flow table entry, and sends the first packet to the control node Cnode 2; the control node Cnode 2 performs policy rule matching on the first data packet to determine a data node C for the data packet to exit the network, determines the control node Cnode2 as a destination control node, and updates a flow table of a data node which the data plane service flow needs to pass. Assuming that a policy rule configured by a network administrator is: IF ip=11.11.11.* THEN block; the control node determines, according to a path of the data node and control node of the SDN network through which the message flows, ① the data node A where a request message enters the network; ② the control node Cnode2 which the request message enters; ③ the data node C where the request message exits the network; ④ the data node C where a response message enters the network, ⑤ the control node Cnode2 which the response message enters; and ⑥ the data node A where the response message exits the network; the control node adds, according to the rule, a flow table entry I having a tuple being ip=11.11.11.* and an action being block to the data node A; in processing of a subsequent service flow data packet, when the flow table matching performed by the data node A on the data packet hits the flow table entry I, the data node A directly drops the data packet, and matches with the hit policy rule at an ingress of the data packet the first time, so as to avoid data transmission and processing of a subsequent node, thereby reducing the network bandwidth resources of the subsequent node device, and avoiding unnecessary consumption of processing resources on the subsequent node.

It can be understood that, the data message of the service flow may also be in a form of client-client, server-client, or server-server; the data node A and the data node C may be managed by different nodes, and a control node is determined according to the foregoing manner, the form of the communication connection between the data node A and the data node C and the nodes is not limited to the OpenFlow protocol only, but further includes a communication connection manner that can be adopted by a person of ordinary skill in the art without creative efforts; and the data node A and the data node C may also be in direct communication connection without using a relay data node. If the service flow of the data node A has multiple destination addresses, a drop operation is only executed on the data node A or a subsequent relay node for a network routing path having a flow table rule of a destination address being drop, which does not affect transmission of another network routing path, and the network routing path and bandwidth resource distribution are managed by the control node. It can be understood that, the foregoing is only an example for helping understanding of the technical solution of the embodiment of the present disclosure, instead of a limit to the embodiment of the present disclosure. The technical solution of the embodiment of the present disclosure may further include another solution that can be implemented by a person of ordinary skill in the art without creative efforts.

Figure 19:
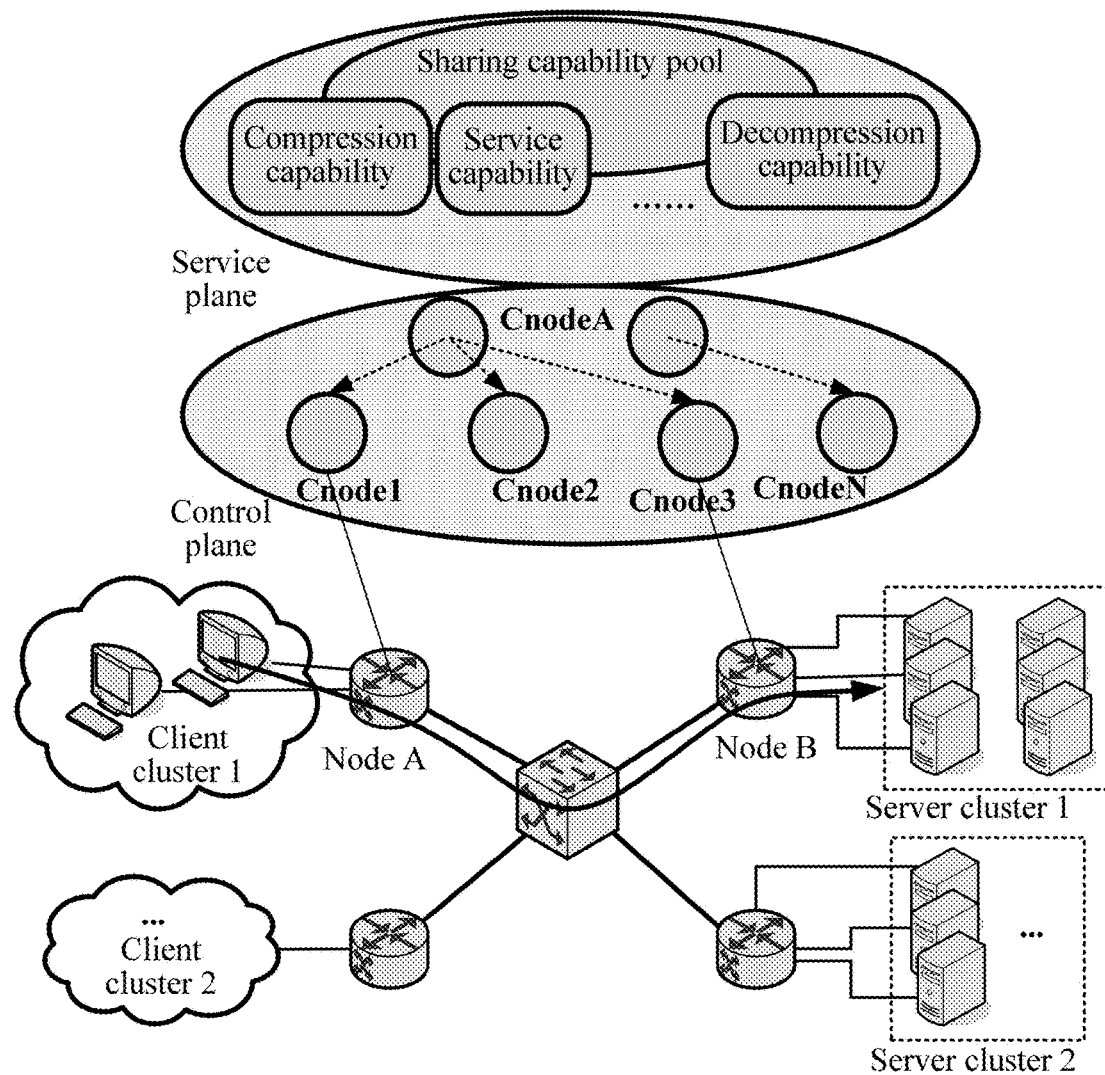
FIG. 19 is a third specific implementation scenario of an SDN data processing system according to an embodiment of the present disclosure.

As shown in FIG. 19, a data message of a certain service flow in a client cluster 1 enters an SDN network from a data node A, the data message is transmitted through multiple relay data nodes (not shown in the drawing), and reaches a server through a data node B. The data node A is managed by a node Cnode1, and the data node A is in communication connection with the node Cnode1 through an OpenFlow protocol; the data node B is managed by a node Cnode3, and the data node B is in communication connection with the node Cnode3 through the OpenFlow protocol. A control node CnodeA is determined according to the node Cnode1 and the node Cnode3, where a procedure of determining the control node has been described in the foregoing, and is not described herein again.

When application layer transmission acceleration needs to be performed on a network service flow, the data node A does not need to be given the capability of compressing service flow message information. The data node A, after rule matching, uploads the service flow message information to the control node CnodeA, and the control node CnodeA obtains, according to a capability requirement of the service flow, a corresponding compression capability and decompression capability based on message content from a service plane, where the obtaining, by the control node CnodeA, the foregoing capabilities from the service plane may be implemented by calling through an open interface. The compression on the service flow data message is completed on the control node CnodeA, and the compressed service flow data message is transmitted to the data node A. The data node A transmits the compressed service flow data message to a data node B, and the data node B then uploads the service flow data message to the control node CnodeA for decompression, so as to obtain the decompressed service flow data message. Accordingly, the service flow of the foregoing client cluster 1 can implement acceleration of application layer transmission from the data node A to the data node B. It can be understood that, the foregoing embodiment is only an example for helping understanding of the embodiment of the present disclosure, instead of a limited explanation to the technical solution of the present disclosure.

Figure 20:
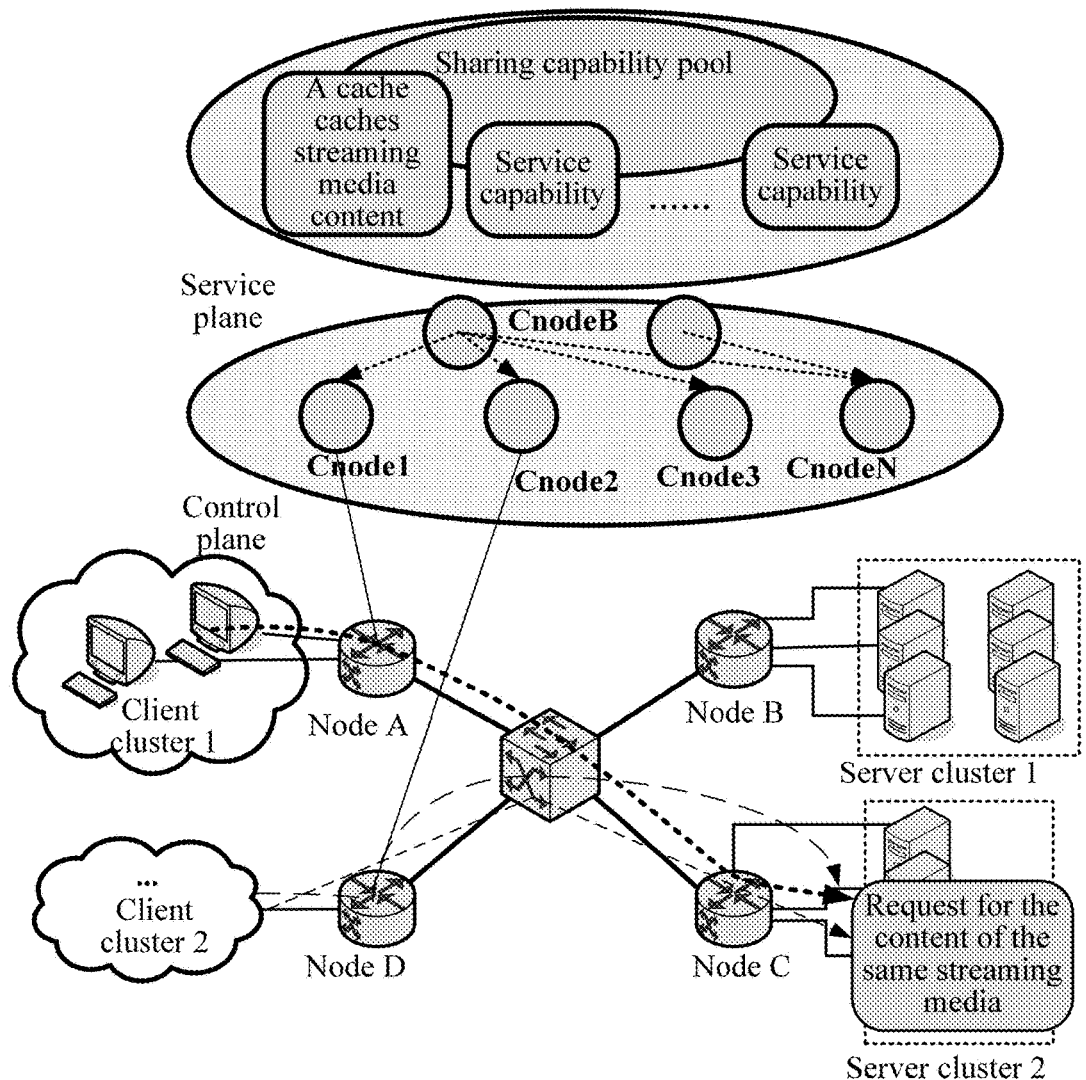
FIG. 20 is a fourth specific implementation scenario of an SDN data processing system according to an embodiment of the present disclosure.

As shown in FIG. 20, in an SDN network structure, a service plane contains a sharing capability pool, the same capability may share data through the sharing capability pool, and the sharing capability pool may be in a form of a global variable, a shared memory, or the same resource access device.

A client in a client cluster 1 and a client in a client cluster 2 request the same streaming media content, and a service flow of the client in the client cluster 1 accesses the SDN network system through a data node A. The data node A is managed by a node Cnode1, and a data node D is managed by a node Cnode2.

First, a related procedure of determining a destination control node Cnode1 of the data node A and a destination control node Cnode 2 of the data node D is described in the foregoing, and is not described herein again. Both the control nodes Cnode1 and Cnode 2 register a Cache cache capability with a service plane, and at the same time, the service plane allocates a read and write interface of Cache cache data for the control nodes Cnode1 and Cnode 2; (1) a data flow of the data node A caches streaming media data content when passing through the control node Cnode1; (2) the data node D accesses the streaming media data content the same as that of the data node A, and when an access request data packet reaches the control node Cnode 2 through the data node D, the control node Cnode 2 activates a Cache cache capability to the service plane, and searches for cache data through a cache data read interface, because the control node Cnode1 has cached the data content requested by the data node A, the control node Cnode 2 finds the cached streaming media content, encapsulates the data into a response data packet to be returned to the data node D. The procedure of the data node D acquiring the data from the server again is saved, thereby increasing the response speed of the client, and reducing the processing pressure of the server at the same time. It can be understood that, the foregoing is only an example for helping understanding of the technical solution of the embodiment of the present disclosure, and cannot be considered as a limit to the technical solution of the embodiment of the present disclosure. The control node may also enable the data node D to obtain corresponding streaming media content by establishing communication connection of the data node A and the data node D, or in another manner that can be implemented by a person of ordinary skill without creative efforts.

It can be clearly learned by a person skilled in the art that, to achieve the purpose of convenient and brief description, for a detailed working process of the foregoing apparatus, reference may be made to the corresponding process in the foregoing method embodiment, and the details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, functional units in the embodiments of the present disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiment of the present disclosure. The foregoing storage medium includes: any mediums that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely exemplary embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A software defined network-based data processing system, comprising:
a plurality of nodes, each of which comprises a processor and memory, wherein the plurality of nodes comprises a source data node, a source control node, and a destination control node;
wherein the source data node is configured to receive a first data packet, and send the first data packet to the source control node, wherein the first data packet includes a destination address of the first data packet;
wherein the source control node is configured to receive the first data packet sent by the source data node, and determine the destination control node according to the destination address of the first data packet;
wherein the destination control node is, configured to receive the first data packet sent by the source control node, and generate a second data packet according to the first data packet and a matching policy rule;
wherein the source data node further stores a flow table to store sub-tuple information of a service flow data packet and a processing rule corresponding to the sub-tuple information of the service flow data packet;
wherein the destination control node is further configured to add a control node number field and a service parameter field in the flow table of the source data node, the control node number field to represent an index of the destination control node corresponding to the source data node, and the service parameter field to represent an index corresponding to a processing result of the sub-tuple information of the service flow data packet;
wherein, the destination control node is further configured to add, in the flow table of the source data node, a control node number field and a service parameter field corresponding to the first data packet, wherein the control node number field represents an index of the destination control node corresponding to the source data node, wherein the service parameter field corresponding to the first data packet represents an index of a matching policy rule corresponding to the sub-tuple information of the first data packet, wherein, a service parameter corresponding to a third data packet comprises the index of the matching policy rule corresponding to the sub-tuple information of the first data packet; and
wherein the source data node is further configured to send the third data packet to the destination control node, wherein the index of the matching policy rule corresponding to the sub-tuple information of the first data packet is carried in the third data packet, and wherein the destination control node is further configured to determine, according to a matching policy rule corresponding to the index of the matching policy rule of the sub-tuple information of the first data packet and an application layer information of the third data packet, an action parameter or a policy parameter executed for the third data packet, so as to generate a fourth data packet.

2. The data processing system according to claim 1, wherein the first data packet includes a source IP address of the first data packet, and wherein the source data node is further configured to determine the source control node as the corresponding source control node according to the source IP address of the first data packet or according to mapping between a data node and a control node.

3. The data processing system according to claim 1, wherein the source data node is further configured to determine a destination data node according to the destination address of the first data packet; and
if the source control node does not manage the destination data node, determine a first control node as the destination control node, the first control node managing the source data node and the destination data node.

4. The data processing system according to claim 1, wherein, the source control node or the source data node is further configured to send the first data packet to the destination control node.

5. The data processing system according to claim 1, wherein, the matching policy rule comprises: mapping/correspondence between sub-tuple information and an action parameter or a policy parameter, or mapping between an application layer information and an action parameter or a policy parameter, and wherein
the destination control node is further configured to: search the matching policy rule, according to the sub-tuple information of the first data packet or the application layer information of the first data packet, for an action parameter or a policy parameter corresponding to the sub-tuple information of the first data packet or the application layer information of the first data packet, wherein
the second data packet is generated according to the action parameter or the policy parameter.

6. The data processing system according to claim 1, wherein, the data processing system further comprises one or more serving nodes, wherein the matching policy rule comprises: mapping/correspondence between sub-tuple information and an action parameter or a policy parameter, or mapping between an application layer information and an action parameter or a policy parameter;
the destination control node is configured to: search the matching policy rule, according to the sub-tuple information of the first data packet or the application layer information of the first data packet, for an action parameter or a policy parameter corresponding to the sub-tuple information of the first data packet or the application layer information of the first data packet; and send, according to the action parameter or policy parameter corresponding to the sub-tuple information of the first data packet or the application layer information of the first data packet, capability request information to a first serving node capable of executing the action parameter or the policy parameter corresponding to the sub-tuple information of the first data packet or the application layer information of the first data packet in the one or more serving nodes,
wherein the first serving node is configured to send corresponding capability response information to the destination control node in response to a capability request information, and wherein
the second data packet is generated according to the capability response information.

7. The data processing system according to claim 1, wherein, the destination control node is further configured to send the second data packet to the source data node, wherein the second data packet carries a destination address of the second data packet, and wherein
the source data node is further configured to send, under management of the destination control node, the second data packet to a data node corresponding to the destination address of the second data packet.

8. The data processing system according to claim 7, wherein, the data processing system further comprises: at least one relay data node, wherein the destination control node is configured to manage each relay data node, wherein:
the relay data node stores a flow table corresponding to the relay data node, wherein the flow table stores a processing rule of a data packet, wherein the source data node stores the flow table corresponding to the source data node, wherein the flow table stores a processing rule of a data packet, wherein
the destination control node is further configured to generate a routing distribution rule and deliver the routing distribution rule to the relay data node and the source data node, the routing distribution rule for allocating a route for the second data packet, wherein
the relay data node is further configured to receive the routing distribution rule sent by the destination control node, and update the flow table corresponding to the relay data node according to the routing distribution rule, wherein
the source data node is further configured to: send, according to the updated flow table, the second data packet to a relay data node corresponding to the destination address of the second data packet, and wherein the second data packet is sent from the relay data node to a destination data node corresponding to the destination address of the second data packet according to the updated flow table.

9. The data processing system according to claim 1, wherein, the source data node is further configured to receive the third data packet, wherein, both the third data packet and the first data packet belong to the service flow data packet, and wherein a processing rule corresponding to sub-tuple information of the third data packet is the same as a processing rule corresponding to the sub-tuple information of the first data packet.

10. The data processing system according to claim 9, wherein, the source data node is further configured to determine, according to the flow table, a service parameter corresponding to the sub-tuple information of the service flow data packet from a processing rule record matching the sub-tuple information of the third data packet, wherein the service parameter represents an index of an action parameter or a policy parameter to be executed for the third data packet, wherein the source data node is further configured to send the third data packet to the destination control node, wherein the service parameter is carried in the third data packet, and wherein
the destination control node is further configured to determine, according to the service parameter and the application layer information of the third data packet, the action parameter or the policy parameter executed for the third data packet, so as to generate the fourth data packet.

11. A software defined network-based data processing method, comprising:
receiving, by a source data node, a first data packet, wherein the first data packet includes a destination address of the first data packet; and
sending, by the source data node, the first data packet to the source control node to enable the source control node to determine a destination control node according to the destination address of the first data packet, the destination control node generates a second data packet according to the first data packet, storing, by the source data node, a flow table to store sub-tuple information of a service flow data packet and a processing rule corresponding to the sub-tuple information of the service flow data packet to enable the destination control node to add a control node number field and a service parameter field in the flow table of the source data node, the control node number field to represent an index of the destination control node corresponding to the source data node, and the service parameter field to represent an index corresponding to a processing result of the sub-tuple information of the service flow data packet, add, in the flow table of the source data node, a control node number field and a service parameter field corresponding to the first data packet, wherein, the control node number field represents an index of the destination control node corresponding to the source data node, wherein the service parameter field corresponding to the first data packet represents an index of a matching policy rule corresponding to the sub-tuple information of the first data packet, wherein, a service parameter corresponding to a third data packet comprises the index of the matching policy rule corresponding to the sub-tuple information of the first data packet; and
sending, by the source data node, the third data packet to the destination control node, wherein the index of the matching policy rule corresponding to the sub-tuple information of the first data packet is carried in the third data packet, and wherein the destination control node is further configured to determine, according to a matching policy rule corresponding to the index of the matching policy rule of the sub-tuple information of the first data packet and an application layer information of the third data packet, an action parameter or a policy parameter executed for the third data packet, so as to generate a fourth data packet.

12. The data processing method according to claim 11, wherein, the second data packet includes a destination address of the second data packet, and the method further comprises:
receiving, by the source data node, the second data packet sent by the destination control node; and
sending, by the source control node, the second data packet to a data node corresponding to the destination address of the second data packet.

13. The data processing method according to claim 11, wherein, the first data packet includes a source IP address of the first data packet, and before the sending, by the source data node, the first data packet to the source control node, the method further comprises: determining the source control node according to the source IP address of the first data packet or according to mapping between the source data node and a control node.

14. The data processing method according to claim 11, wherein, the source data node further stores the flow table, wherein the flow table is used to store the sub-tuple information of the service flow data packet and the processing rule corresponding to the sub-tuple information; and after the sending, by the source data node, the first data packet to the source control node, the method further comprises:
receiving, by the source data node, first control information sent by the destination control node; and
adding, by the source data node, according to the first control information, the control node number field and the service parameter field in the flow table of the source data node, wherein the control node number field represents the index of the destination control node corresponding to the source data node, and the service parameter field represents the index corresponding to the processing result of the sub-tuple information of the service flow data packet.

15. The data processing method according to claim 14, wherein, after adding the control node number field and the service parameter field in the flow table of the source data node, the method further comprises:
    receiving, by the source data node, the third data packet, wherein both the third data packet and the first data packet belong to the service flow data packet, and a processing rule corresponding to sub-tuple information of the third data packet is the same as the processing rule corresponding to the sub-tuple information of the first data packet;
    determining, by the source data node according to the flow table, a service parameter corresponding to the sub-tuple information from a processing rule record matching the sub-tuple information of the third data packet, wherein the service parameter represents an index of an action parameter or a policy parameter to be executed for the third data packet; and
    carrying, by the source data node, the service parameter in the third data packet and sending the third data packet to the destination control node, to enable the destination control node to determine, according to the service parameter and the application layer information of the third data packet, the action parameter or policy parameter executed for the third data packet, so as to generate the fourth data packet.

16. A software defined network-based data processing method, comprising:
    receiving, by a destination control node, a first data packet, wherein the first data packet includes a destination address of the first data packet, the destination control node is determined by a source control node according to the destination address of the first data packet, and the source control node corresponds to a source data node receiving the first data packet, wherein the source data node further stores a flow table to store sub-tuple information of a service flow data packet and a processing rule corresponding to the sub-tuple information of the service flow data packet; and
    generating, by the destination control node, a second data packet according to the first data packet and a matching policy rule;
    adding, by the destination control node, a control node number field and a service parameter field in the flow table of the source data node, the control node number field to represent an index of the destination control node corresponding to the source data node, and the service parameter field to represent an index corresponding to a processing result of the sub-tuple information of the service flow data packet;
    adding, by the destination control node, in the flow table of the source data node, a control node number field and a service parameter field corresponding to the first data packet, wherein, the control node number field represents an index of the destination control node corresponding to the source data node to enable the source node to send a third data packet to the destination control node, wherein the index of the matching policy rule corresponding to the sub-tuple information of the first data packet is carried in the third data packet, and wherein the destination control node is further configured to determine, according to a matching policy rule corresponding to the index of the matching policy rule of the sub-tuple information of the first data packet and an application layer information of the third data packet, an action parameter or a policy parameter executed for the third data packet, so as to generate a fourth data packet;
    wherein the service parameter field corresponding to the first data packet represents an index of a matching policy rule corresponding to the sub-tuple information of the first data packet, wherein, a service parameter corresponding to the third data packet comprises the index of the matching policy rule corresponding to the sub-tuple information of the first data packet.

17. The data processing method according to claim 16, wherein, before the receiving, by the destination control node, the first data packet, the method further comprises:
    receiving, by the destination control node, a fifth data packet sent by the source control node, wherein the fifth data packet includes a destination address of the fifth data packet;
    determining a destination data node according to the destination address of the fifth data packet; and
    if the destination control node does not manage the destination data node, determining a first control node managing the destination data node and the source data node as a second destination control node.

18. The data processing method according to claim 16, wherein, the receiving, by the destination control node, the first data packet comprises:
    receiving, by the destination control node, the first data packet sent by the source control node or the source data node.

19. The data processing method according to claim 16, wherein, the matching policy rule comprises: mapping/correspondence between sub-tuple information and an action parameter or a policy parameter, or mapping between an application layer information and an action parameter or a policy parameter; and the generating, by the destination control node, the second data packet according to the first data packet and the matching policy rule comprises:
    searching the matching policy rule, according to the sub-tuple information of the first data packet or the application layer information of the first data packet, for an action parameter or a policy parameter corresponding to the sub-tuple information of the first data packet or the application layer information of the first data packet; and
    generating the second data packet according to the found action parameter or policy parameter.

20. The data processing method according to claim 16, wherein, the matching policy rule comprises: mapping/correspondence between sub-tuple information and an action parameter or a policy parameter, or mapping between an application layer information and an action parameter or a policy parameter; and the generating, by the destination control node, the second data packet according to the first data packet and the matching policy rule comprises:
    searching the matching policy rule, according to sub-tuple information of the first data packet or the application layer information of the first data packet, for an action parameter or a policy parameter corresponding to the sub-tuple information of the first data packet or the application layer information of the first data packet;
    sending, according to the found action parameter or policy parameter, capability request information to a first serving node having the capability of executing the action parameter or policy parameter in one or more serving nodes;

receiving, by the destination control node, corresponding capability response information sent by the first serving node in response to the capability request information; and generating, by the destination control node, the second data packet according to the capability response information.

21. The data processing method according to claim 16, wherein, after the determining, by the source control node, the destination control node according to the destination address of the first data packet, the method further comprises:

sending, by the destination control node, first control information to the source data node, wherein the first control information is used to add the control node number field and the service parameter field in the flow table of the source data node, the control node number field represents the index of the destination control node corresponding to the source data node, and the service parameter field represents the index corresponding to the processing result of the sub-tuple information of the service flow data packet.

22. The data processing method according to claim 21, wherein, after adding the control node number field and the service parameter field in the flow table of the source data node, the method further comprises:

receiving, by the destination control node, the third data packet including a service parameter, wherein both the third data packet and the first data packet belong to the service flow data packet, a processing rule corresponding to sub-tuple information of the third data packet is the same as the processing rule corresponding to the sub-tuple information of the first data packet, the service parameter is a service parameter corresponding to the sub-tuple information, which is determined from a processing rule record matching the sub-tuple information of the third data packet, and the service parameter represents an index of an action parameter or a policy parameter to be executed for the third data packet;

determining, by the destination control node according to the service parameter and the application layer information of the third data packet, the action parameter or policy parameter executed for the third data packet, so as to generate the fourth data packet; and sending, by the destination control node, the fourth data packet to the source data node.

23. A data node for software defined network-based data processing comprising:

a first receiver and a first transmitter wherein the first receiver is connected to the first transmitter;

a memory comprising instructions;

a processor in communication with the memory wherein the processor executes the instructions to:

receive, by the first receiver, a first data packet; and send, by the first transmitter, the first data packet to a source control node, to enable the source control node to determine a destination control node according to a destination address of the first data packet, and the destination control node generates a second data packet according to the first data packet;

store, by the memory, a flow table to store sub-tuple information of a service flow data packet and a processing rule corresponding to the sub-tuple information of the service flow data packet to enable the destination control node to add a control node number field and a service parameter field in the flow table of the source data node, the control node number field to represent an index of the destination control node corresponding to the source data node, and the service parameter field to represent an index corresponding to a processing result of the sub-tuple information of the service flow data packet, add, in the flow table of the source data node, a control node number field and a service parameter field corresponding to the first data packet, wherein, the control node number field represents an index of the destination control node corresponding to the source data node, wherein the service parameter field corresponding to the first data packet represents an index of a matching policy rule corresponding to the sub-tuple information of the first data packet, wherein, a service parameter corresponding to a third data packet comprises the index of the matching policy rule corresponding to the sub-tuple information of the first data packet; and send, by the first transmitter, the third data packet to the destination control node, wherein the index of the matching policy rule corresponding to the sub-tuple information of the first data packet is carried in the third data packet, and wherein the destination control node is further configured to determine, according to a matching policy rule corresponding to the index of the matching policy rule of the sub-tuple information of the first data packet and an application layer information of the third data packet, an action parameter or a policy parameter executed for the third data packet, so as to generate a fourth data packet.

24. The data node according to claim 23, wherein, the first receiver is further configured to receive the second data packet sent by the destination control node; the first transmitter is further configured to send, according to a destination address of the second data packet carried in the second data packet, the second data packet received by the receiving module to a data node corresponding to the destination address.

25. The data node according to claim 23, further comprising:

wherein the memory is configured to store the flow table, the flow table is used to store the sub-tuple information of the service flow data packet and the processing rule corresponding to the sub-tuple information.

26. The data node according to claim 25, further comprising:

the first receiver is further configured to receive first control information sent by the destination control node; and the processor is configured to add, according to the first control information, the control node number field and the service parameter field in the flow table of the memory, wherein the control node number field represents the index of the destination control node corresponding to the source data node, and the service parameter field represents the index corresponding to a processing result of the sub-tuple information of the service flow data packet.

27. The data node according to claim 26, wherein, the processor is connected to the first transmitter, the first receiver is further configured to receive the third data packet, wherein both the third data packet and the first data packet belong to the service flow data packet, and a processing rule corresponding to sub-tuple information of the third data packet is the same as the processing rule corresponding to the sub-tuple information of the first data packet;

the processor is further configured to determine, according to the flow table, a service parameter corresponding to the sub-tuple information from a processing rule record matching the sub-tuple information of the third data packet, wherein the service parameter represents an index of an action parameter or a policy parameter to be executed for the third data packet; and the first transmitter is further configured to carry the service parameter in the third data packet and sends the third data packet to the destination control node, to enable the destination control node to determine, according to the service parameter and the application layer information of the third data packet, the action parameter or policy parameter executed for the third data packet, so as to generate the fourth data packet.

28. A destination control node for software defined network-based data processing comprising:

a receiver and a transmitter wherein the receiver is connected to the transmitter;

a memory comprising instructions;

a processor in communication with the memory wherein the processor executes the instructions to:

receive, by the receiver, a first data packet, wherein the first data packet includes a destination address of the first data packet, the destination control node is determined by a source control node according to the destination address of the first data packet, and the source control node corresponds to a source data node receiving the first data packet; and generate a second data packet according to the second data packet received by the receiver and a matching policy rule;

add, a control node number field and a service parameter field in a flow table of the source data node, the control node number field to represent an index of the destination control node corresponding to the source data node, and the service parameter field to represent an index corresponding to a processing result of the sub-tuple information of the service flow data packet;

add, in the flow table of the source data node, a control node number field and a service parameter field corresponding to the first data packet, wherein, the control node number field represents an index of the destination control node corresponding to the source data node to enable the source node to send a third data packet to the destination control node, wherein the index of the matching policy rule corresponding to the sub-tuple information of the first data packet is carried in the third data packet, and wherein the destination control node is further configured to determine, according to a matching policy rule corresponding to the index of the matching policy rule of the sub-tuple information of the first data packet and an application layer information of the third data packet, an action parameter or a policy parameter executed for the third data packet, so as to generate a fourth data packet;

wherein the service parameter field corresponding to the first data packet represents an index of a matching policy rule corresponding to the sub-tuple information of the first data packet, wherein, a service parameter corresponding to the third data packet comprises the index of the matching policy rule corresponding to the sub-tuple information of the first data packet.

29. The destination control node for data processing according to claim 28, wherein: the receiver is further configured to receive a fifth data packet, wherein the fifth data packet includes a destination address of the fifth data packet; and the processor is configured to determine a destination data node according to the destination address of the fifth data packet; and if the processor does not manage the destination data node, determine a first control node managing the destination data node and the source data node as a second destination control node.

30. The destination control node for data processing according to claim 28, wherein, the receiver is configured to receive the first data packet sent by the source control node or the source data node.

31. The destination control node according to claim 28, wherein, the matching policy rule comprises: mapping/correspondence between sub-tuple information and an action parameter or a policy parameter, or mapping between an application layer information and an action parameter or a policy parameter; and the processor comprises:

a policy matching unit, configured to search the matching policy rule, according to the sub-tuple information of the first data packet or the application layer information of the first data packet, for an action parameter or a policy parameter corresponding to the sub-tuple information of the first data packet or the application layer information of the first data packet; and a second data packet generating unit, configured to generate the second data packet according to the action parameter or policy parameter found by the policy matching unit.

32. The destination control node according to claim 28, wherein, the matching policy rule comprises: mapping/correspondence between sub-tuple information and an action parameter or a policy parameter, or mapping between an application layer information and an action parameter or a policy parameter; the processor comprises: a policy matching unit and a second data packet generating unit, wherein:

the policy matching unit is configured to search the matching policy rule, according to the sub-tuple information of the first data packet or the application layer information of the first data packet, for an action parameter or a policy parameter corresponding to the sub-tuple information of the first data packet or the application layer information of the first data packet;

the second sending module is further configured to send, according to the action parameter or policy parameter found by the policy matching unit, capability request information to a first serving node having the capability of executing the action parameter or policy parameter in one or more serving nodes;

the receiver is further configured to receive corresponding capability response information sent by the first serving node in response to the capability request information; and the second data packet generating unit is configured to generate the second data packet according to the capability response information received by the receiver.

33. The destination control node according to claim 28, wherein, the transmitter is further configured to send first control information, wherein the first control information is used to add the control node number field and the service parameter field in flow table of the source data node, the control node number field represents the index of the destination control node corresponding to the source data node, and the service parameter field represents the index corresponding to the processing result of the sub-tuple information of the service flow data packet.

34. The destination control node according to claim 33, wherein:

the receiver is further configured to receive the third data packet carrying a service parameter, wherein both the third data packet and the first data packet belong to the service flow data packet, a processing rule corresponding to sub-tuple information of the third data packet is the same as the processing rule corresponding to the sub-tuple information of the first data packet, the service parameter is a service parameter corresponding to the sub-tuple information, which is determined from a processing rule record matching the sub-tuple information of the third data packet, and the service parameter represents an index of an action parameter or a policy parameter to be executed for the third data packet;

the processor is further configured to determine, according to the service parameter and the application layer information of the third data packet, the action parameter or the policy parameter executed for the third data packet, and generate the fourth data packet; and the transmitter is further configured to send the fourth data packet to the source data node.

* * * * *